US011886904B2

(12) United States Patent
Huang et al.

(10) Patent No.: US 11,886,904 B2
(45) Date of Patent: Jan. 30, 2024

(54) VIRTUAL NETWORK FUNCTION VNF DEPLOYMENT METHOD AND APPARATUS

(71) Applicant: Huawei Technologies Co., Ltd., Shenzhen (CN)

(72) Inventors: Zexu Huang, Dongguan (CN); Xianjie Meng, Shenzhen (CN); Shubing Zhang, Dongguan (CN); Ridong Xu, Dongguan (CN); Deming Yu, Shenzhen (CN); Peili Han, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 588 days.

(21) Appl. No.: 17/137,004

(22) Filed: Dec. 29, 2020

(65) Prior Publication Data

US 2021/0117225 A1  Apr. 22, 2021

Related U.S. Application Data

(63) Continuation of application No. PCT/CN2019/092587, filed on Jun. 24, 2019.

(30) Foreign Application Priority Data

Jun. 29, 2018  (CN) .......................... 201810713513.5

(51) Int. Cl.
*G06F 9/455* (2018.01)
*G06F 9/50* (2006.01)

(52) U.S. Cl.
CPC ........ *G06F 9/45558* (2013.01); *G06F 9/5077* (2013.01); *G06F 9/5083* (2013.01);
(Continued)

(58) Field of Classification Search
CPC .................................................. G06F 9/45558
(Continued)

(56) References Cited

U.S. PATENT DOCUMENTS 10,606,718 B1 *  3/2020  Sandlerman ............ G06F 11/20
10,678,604 B2 *  6/2020  Gokurakuji ......... H04L 41/5041
(Continued)

FOREIGN PATENT DOCUMENTS

CN  104142853 A  11/2014
CN  105681077 A   6/2016
(Continued)

OTHER PUBLICATIONS

"Network Function Virtualization (NFV) Management and Orchestration," GS NFV-MAN 001 V0.6.3, European Telecommunications Standards Institute (ETSI), pp. 1-197, Sophia Antipolis, Cedex, France (Sep. 2014).

(Continued)

*Primary Examiner* — Mehran Kamran
(74) *Attorney, Agent, or Firm* — Leydig, Voit & Mayer, Ltd.

(57) ABSTRACT

A virtual network function (VNF) deployment method and apparatus is provided. The method comprises: obtaining a virtual network function descriptor (VNFD), where the VNFD includes input parameter information, input adaptation information, and VNF descriptor information; the input parameter information includes N pieces of management unit information, each piece of management unit information is used to describe an attribute of a management unit; the input adaptation information is used to indicate a mapping relationship between the management unit and a logical management unit; mapping management units corresponding to the N management unit identifiers to the N logical management units based on the input adaptation information; and creating the VNF on the N logical management units based on the VNF descriptor information. The embodiments of this application are applicable to VNF deployment process.

15 Claims, 13 Drawing Sheets

(52) U.S. Cl.
CPC .............. *G06F 2009/4557* (2013.01); *G06F 2009/45562* (2013.01); *G06F 2009/45595* (2013.01)

(58) Field of Classification Search
USPC .......................................................... 718/1
See application file for complete search history.

(56) References Cited

U.S. PATENT DOCUMENTS

| | | | | |
|---|---|---|---|---|
| 10,693,817 | B1* | 6/2020 | Melkild | H04L 49/557 |
| 10,764,118 | B1* | 9/2020 | Melkild | H04L 41/0668 |
| 11,683,222 | B2* | 6/2023 | Li | H04L 41/0843 |
| | | | | 709/223 |
| 11,693,687 | B1* | 7/2023 | Melkild | G06F 9/48 |
| | | | | 718/1 |
| 11,736,416 | B1* | 8/2023 | Melkild | H04L 67/145 |
| | | | | 370/217 |
| 2016/0373474 | A1* | 12/2016 | Sood | G06F 21/50 |
| 2017/0006083 | A1* | 1/2017 | McDonnell | H04L 41/12 |
| 2017/0331884 | A1* | 11/2017 | Colle | G06F 9/45558 |
| 2018/0004576 | A1* | 1/2018 | Gokurakuji | G06F 9/5077 |
| 2019/0034219 | A1* | 1/2019 | Xu | G06F 9/5077 |
| 2019/0044799 | A1* | 2/2019 | Browne | H04L 41/082 |
| 2019/0132211 | A1* | 5/2019 | Yeung | H04L 67/10 |
| 2019/0149408 | A1* | 5/2019 | Li | H04L 41/40 |
| | | | | 709/223 |
| 2019/0266012 | A1* | 8/2019 | Chou | G06F 9/5077 |
| 2019/0342187 | A1* | 11/2019 | Zavesky | H04L 41/0895 |
| 2020/0034180 | A1* | 1/2020 | Hoshino | H04L 41/0668 |
| 2020/0065148 | A1* | 2/2020 | Ji | G06F 9/5005 |
| 2020/0313969 | A1* | 10/2020 | Li | H04L 41/0806 |
| 2021/0117225 | A1* | 4/2021 | Huang | H04L 43/20 |
| 2021/0144056 | A1* | 5/2021 | Chakrapani Rangarajan | |
| | | | | H04L 41/5012 |
| 2021/0149699 | A1* | 5/2021 | Celozzi | G06F 11/076 |
| 2021/0176112 | A1* | 6/2021 | Cherunni | G06F 9/5077 |
| 2021/0326306 | A1* | 10/2021 | Li | H04L 41/0806 |

FOREIGN PATENT DOCUMENTS

| | | |
|---|---|---|
| CN | 106161173 A | 11/2016 |
| CN | 107533484 A | 1/2018 |
| CN | 107689882 A | 2/2018 |
| CN | 108123824 A | 6/2018 |
| EP | 3098718 A1 | 11/2016 |
| EP | 3249860 A1 | 11/2017 |
| WO | 2015168834 A1 | 11/2015 |

OTHER PUBLICATIONS

"Network Functions Virtualisation (NFV) Release 2; Management and Orchestration; VNF Descriptor and Packaging Specification," ETSI GS NFV-IFA 011 V2.4.5, European Telecommunications Standards Institute (ETSI), pp. 1-68, Sophia Antipolis, Cedex, France (Jun. 2018).

* cited by examiner

Scenario 1

Scenario 2

Scenario 3

Scenario 4

Scenario 5

VIRTUAL NETWORK FUNCTION VNF DEPLOYMENT METHOD AND APPARATUS

CROSS-REFERENCE TO RELATED APPLICATIONS

This application is a continuation of International Application No. PCT/CN2019/092587, filed on Jun. 24, 2019, which claims priority to Chinese Patent Application No. 201810713513.5, filed on Jun. 29, 2018. The disclosures of the aforementioned applications are hereby incorporated by reference in their entireties.

TECHNICAL FIELD

Embodiments of this application relate to the field of network function virtualization, and in particular, to a virtual network function VNF deployment method and apparatus.

BACKGROUND

Currently, a network function virtualization (NFV) technology is gradually popularized. The NFV technology can convert a function of each network element used in a telecommunications network into an independent application. The independent application may be flexibly deployed on a unified infrastructure platform constructed based on a standard server, a storage device, a switch, and other devices. When a virtual network function (VNF) is deployed in an NFV system, to improve data reliability and network reliability, VNFs with a same function may be deployed on a plurality of management units. For example, the management unit may be an availability zone (AZ) or a host aggregate (HA) on OpenStack. FIG. 1 is a diagram of example VNF deployment according to the prior art. As shown in FIG. 1, a VNF 1 is deployed on two management units: an AZ 1 and an AZ 2. A capacity of the AZ 1 is the same as a capacity of an equipment room 1 corresponding to the AZ 1, and a capacity of the AZ 2 is the same as a capacity of an equipment room 2 corresponding to the AZ 2. When a management unit is faulty, other management units may still provide a service. In other words, when a single equipment room is faulty, other equipment rooms may still provide the service. In this way, the overall reliability is improved by adding VNFs.

However, a virtual network function descriptor (VNFD) is required for deploying each VNF. In the foregoing VNF deployment scenario, there are a large quantity of VNFDs that incur high maintenance and management costs. In addition, if the equipment room is faulty, it is costly to ensure service continuity.

SUMMARY

Embodiments of this application provide a virtual network function deployment method and apparatus, to resolve a problem that a large quantity of VNFDs are caused when a VNF is deployed in an NFV system and maintenance and management costs are high.

To achieve the foregoing objective, the following technical solutions are used in the embodiments of this application.

According to a first aspect, an embodiment of this application provides a virtual network function deployment method. The method may be applied to a virtualized network function manager (VNFM), and/or the method may be applied to a communications apparatus that can support the virtualized network function manager to implement the method. For example, the communications apparatus includes a chip system, and the method includes: first, obtaining a VNFD from an NFV orchestrator (NFVO) or a browser, and obtaining N management unit identifiers entered by a user, where the VNFD includes input parameter information, input adaptation information, and virtual network function VNF descriptor information; the input parameter information includes N pieces of management unit information, each piece of management unit information is used to describe an attribute of a management unit, and the attribute of the management unit includes a type and a name of the management unit; the input adaptation information is used to indicate a mapping relationship between the management unit and a logical management unit; the VNF descriptor information is used to indicate to deploy a VNF on N logical management units, and N is an integer greater than or equal to 2; a capacity of a management unit corresponding to a management unit identifier is the same as a capacity of a fault domain corresponding to the management unit, in other words, a subrack, a rack, or an equipment room is mapped as a management unit in an NFV system, and one management unit may correspond to one fault domain; then, mapping management units corresponding to the N management unit identifiers to the N logical management units based on the input adaptation information; and creating the VNF on the N logical management units based on the VNF descriptor information.

According to the virtual network function deployment method provided in this embodiment of this application, when one VNF is deployed on the N management units, the VNFM may map the management units corresponding to the N management unit identifiers to the N logical management units based on the input adaptation information included in a preconfigured VNFD, so that the VNFM suppresses a fault domain difference, exposes only an abstracted and unique logical management unit to the VNF, and deploys the VNF on more than two logical management units. In other words, this implements VNF deployment on a plurality of management units, which is equivalent to that this implements VNF deployment in a plurality of fault domains. In this way, data reliability and network reliability are improved, internal processing of VNF software is unified, a quantity of VNFDs is reduced, complexity caused by a plurality of solutions is avoided, and software version adaptability is enhanced.

The input parameter information further includes M pieces of cloud operating system information and storage information. Each piece of cloud operating system information is used to describe an attribute of a cloud operating system, and the attribute of the cloud operating system includes a type and a name of the cloud operating system. The storage information is used to describe a storage attribute, and the storage attribute includes a storage type and a storage name. The input adaptation information is further used to indicate a mapping relationship between the cloud operating system and the logical management unit. M is an integer greater than or equal to 1.

With reference to the foregoing possible implementations, in another possible implementation, after the obtaining N management unit identifiers, the method further includes: obtaining M cloud operating system identifiers, wherein the management units corresponding to the N management unit identifiers belong to M cloud operating systems corresponding to the M cloud operating system identifiers.

With reference to the foregoing possible implementations, the VNFD further includes virtual machine deployment information, and the virtual machine deployment information is used to indicate a deployment manner of a primary virtual machine, a secondary virtual machine, and a load-sharing virtual machine in the N logical management units.

With reference to the foregoing possible implementations, in another possible implementation, the creating the VNF on the N logical management units based on the VNF descriptor information includes: the VNFM sends a network creation message to a virtualized infrastructure manager (VIM), where the network creation message is used to indicate the VIM to allocate a resource required for creating the VNF; the VNFM receives a network creation confirmation message sent by the VIM; the VNFM sends a virtual machine creation system message to the VIM, where the virtual machine creation system message includes a central processing unit capacity, a memory capacity, and a disk capacity that are required for creating the VNF; and the VNFM receives a virtual machine creation confirmation system message sent by the VIM.

Further, after the receiving a virtual machine creation confirmation system message sent by the VIM, the method further includes: sending a correspondence between each of the N logical management units and a virtual machine to the VNF.

Optionally, after the receiving a virtual machine creation confirmation system message sent by the VIM, the method further includes: sending a correspondence between each of the N logical management units and a virtual machine to an element management system (EMS).

With reference to the foregoing possible implementations, in another possible implementation, the VNFM may include a query interface, and the query interface is used by the EMS to query the correspondence between each of the N logical management units and the virtual machine.

According to a second aspect, an embodiment of this application provides a virtual network function deployment method. The method may be applied to a virtual network function, and/or the method may be applied to a communications apparatus that can support the virtual network function to implement the method. For example, the communications apparatus includes a chip system, and the method includes: receiving a correspondence, between each of N logical management units and a virtual machine, that is sent by a VNFM, where N is an integer greater than or equal to 2; and storing running data based on the correspondence between each of the N logical management units and the virtual machine. According to the virtual network function deployment method provided in this embodiment of this application, when one VNF is deployed on N management units, management units corresponding to N management unit identifiers may be mapped to N logical management units based on input adaptation information included in a preconfigured VNFD, so that the VNFM suppresses a fault domain difference, exposes only an abstracted and unique logical management unit to the VNF, and deploys the VNF on more than two logical management units. In other words, this implements VNF deployment on a plurality of management units, which is equivalent to that this implements VNF deployment in a plurality of fault domains. In this way, data reliability and network reliability are improved, internal processing of VNF software is unified, a quantity of VNFDs is reduced, complexity caused by a plurality of solutions is avoided, and software version adaptability is enhanced.

According to a third aspect, an embodiment of this application provides a detection method. The method may be applied to a virtual network function, and/or the method may be applied to a communications apparatus that can support the virtual network function to implement the method. For example, the communications apparatus includes a chip system, and the method includes: detecting a first path, where the first path is an internal path between two logical management units that carry a VNF; if the first path is faulty, detecting a second path, where the second path is an external path between the two logical management units that carry the VNF; if the second path is normal, randomly selecting one logical management unit from the two logical management units that carry the VNF, to provide a service to the outside; if the second path is faulty, detecting a path of a first logical management unit of the two logical management units that carry the VNF by using a third-party network element, and detecting a path of a second logical management unit that carries the VNF by using the third-party network element; and determining that a logical management unit whose path to the third-party network element is normal provides the service to the outside.

According to a fourth aspect, an embodiment of this application provides a detection method. The method may be applied to a virtual network function, and/or the method may be applied to a communications apparatus that can support the virtual network function to implement the method. For example, the communications apparatus includes a chip system, and the method includes: determining an abnormal logical management unit in two logical management units by using a data packet between the two logical management units that carry a VNF; or determining an abnormal virtual machine in a $j^{th}$ logical management unit by using a data packet between virtual machines in the $j^{th}$ logical management unit in the two logical management units that carry the VNF, where j is a positive integer, and j ranges from 1 to N.

According to a fifth aspect, an embodiment of this application provides a communications apparatus, configured to implement the method described in the first aspect. The communications apparatus is a VNFM or a communications apparatus that supports the VNFM to implement the method described in the first aspect. For example, the communications apparatus includes a chip system. For example, the communications apparatus includes a receiving unit and a processing unit. The receiving unit is configured to obtain a VNFD from an NFVO, where the VNFD includes input parameter information, input adaptation information, and VNF descriptor information; the input parameter information includes N pieces of management unit information, each piece of management unit information is used to describe an attribute of a management unit, and the attribute of the management unit includes a type and a name of the management unit; the input adaptation information is used to indicate a mapping relationship between the management unit and a logical management unit; and the VNF descriptor information is used to indicate to deploy a VNF on the N logical management units, and N is an integer greater than or equal to 2. The receiving unit is further configured to obtain N management unit identifiers, where a capacity of a management unit corresponding to a management unit identifier is the same as a capacity of a fault domain corresponding to the management unit. The processing unit is configured to map management units corresponding to the N management unit identifiers to the N logical management units based on the input adaptation information. The processing unit is further configured to create the VNF on the N logical management units based on the VNF descriptor information.

According to a sixth aspect, an embodiment of this application provides a communications apparatus, configured to implement the method described in the second aspect. The communications apparatus is a VNF or a communications apparatus that supports the VNF to implement the method described in the second aspect. For example, the communications apparatus includes a chip system. For example, the communications apparatus includes a receiving unit and a processing unit. The receiving unit is configured to receive a correspondence, between each of N logical management units and a virtual machine, that is sent by a virtualized network function manager VNFM, where N is an integer greater than or equal to 2. The processing unit is configured to store running data based on the correspondence between each of the N logical management units and the virtual machine.

According to a seventh aspect, an embodiment of this application provides a communications apparatus, configured to implement the method described in the third aspect. The communications apparatus is a VNF or a communications apparatus that supports a VNF to implement the method described in the third aspect. For example, the communications apparatus includes a chip system. For example, the communications apparatus includes a processing unit. The processing unit is configured to detect a first path, where the first path is an internal path between two logical management units that carry the VNF. If the first path is faulty, the processing unit is further configured to detect a second path, where the second path is an external path between the two logical management units that carry the VNF. If the second path is normal, the processing unit is further configured to randomly select, from the two logical management units that carry the VNF, one logical management unit to provide a service to the outside. If the second path is faulty, the processing unit is further configured to detect path of a first logical management unit of the two logical management units that carry the VNF by using a third-party network element, and detect a path of a second logical management unit that carries the VNF by using the third-party network element. The processing unit is further configured to determine that a logical management unit whose path to the third-party network element is normal provides the service to the outside.

According to an eighth aspect, an embodiment of this application provides a communications apparatus, configured to implement the method described in the fourth aspect. The communications apparatus is a VNF or a communications apparatus that supports a VNF to implement the method described in the fourth aspect. For example, the communications apparatus includes a chip system. For example, the communications apparatus includes a processing unit. The processing unit is configured to determine an abnormal logical management unit in two logical management units by using a data packet between the two logical management units that carry the VNF. Alternatively, the processing unit is configured to determine an abnormal virtual machine in a $j^{th}$ logical management unit by using a data packet between virtual machines in the $j^{th}$ logical management unit in the two logical management units that carry the VNF, where j is a positive integer, and j ranges from 1 to N.

Optionally, the communications apparatus may further include a communications interface, configured to send or receive data.

It should be noted that the functional modules in the fifth aspect and the eighth aspect may be implemented by hardware, or may be implemented by hardware executing corresponding software. The hardware or software includes one or more modules corresponding to the foregoing function. For example, a transceiver is configured to complete functions of a receiving unit and a sending unit, a processor is configured to complete functions of the processing unit, and a memory is configured to process a program instruction of the method in the embodiments of this application. The processor, the transceiver, and the memory are connected and communicate with each other by using a bus. For details, refer to functions of actions of the VNFM in the method according to the first aspect, and functions of actions of the VNF in the methods according to the second aspect to the fourth aspect.

According to a ninth aspect, an embodiment of this application further provides a communications apparatus, configured to implement the method described in the first aspect. The communications apparatus is a VNFM or a communications apparatus that supports the VNFM to implement the method described in the first aspect. For example, the communications apparatus includes a chip system. For example, the communications apparatus includes a processor, configured to implement the functions of the method described in the first aspect. The communications apparatus may further include a memory, configured to store a program instruction and data. The memory is coupled to the processor, and the processor may invoke and execute the program instruction stored in the memory, to implement the functions in the method described in the first aspect. The communications apparatus may further include a communications interface, and the communications interface is used by the communications apparatus to communicate with another device. For example, the another device is a VNF or an NFVO.

In a possible device, the communications apparatus includes the communications interface, and the communications interface is used by the communications apparatus to communicate with another apparatus. For example, the communications interface may be a transceiver, and the transceiver is configured to obtain a VNFD and N management unit identifiers, or the transceiver is configured to send or receive data. The memory is configured to store the program instruction. The processor is configured to map management units corresponding to the N management unit identifiers to N logical management units based on input adaptation information. A processor is further configured to create the VNF on the N logical management units based on VNF descriptor information.

Optionally, a method is the same as that in the corresponding description in the first aspect, and details are not described herein again.

According to a tenth aspect, an embodiment of this application further provides a communications apparatus, configured to implement the methods described in the second aspect, the third aspect, and the fourth aspect. The communications apparatus is a VNFM or a communications apparatus that supports the VNFM to implement the methods described in the second aspect, the third aspect, and the fourth aspect. For example, the communications apparatus includes a chip system. For example, the communications apparatus includes a processor, configured to implement the functions in the methods described in the second aspect, the third aspect, and the fourth aspect. The communications apparatus may further include a memory, configured to store a program instruction and data. The memory is coupled to the processor, and the processor may invoke and execute the program instruction stored in the memory, to implement the function in the methods described in the second aspect, the third aspect, and the fourth aspect. The communications apparatus may further include a communications interface, and the communications interface is used by the communications apparatus to communicate with another device. For example, the another device is a VNFM.

In a possible device, the communications apparatus includes the communications interface, and the communications interface is used by the communications apparatus to communicate with another apparatus. For example, the communications interface may be a transceiver. The memory is configured to store the program instruction. The processor is configured to store running data based on a correspondence between each of N logical management units and a virtual machine.

According to an eleventh aspect, an embodiment of this application further provides a computer-readable storage medium, including a computer software instruction. When the computer software instruction is run on a communications apparatus, the communications apparatus is enabled to perform the method according to any one of the first aspect to the fourth aspect.

According to a twelfth aspect, an embodiment of this application further provides a computer program product including an instruction. When the computer program product runs on a communications apparatus, the communication apparatus is enabled to perform the method according to any one of the first aspect to the fourth aspect.

According to a thirteenth aspect, an embodiment of this application provides a chip system. The chip system includes a processor, and may further include a memory, configured to implement functions of the VNFM or the VNF in the foregoing method. The chip system may include a chip, or may include a chip and another discrete component.

According to a fourteenth aspect, an embodiment of this application further provides a communications system. The communications system includes a VNFM or a communications apparatus that supports the VNFM to implement the method described in the first aspect that is described in the fifth aspect, a VNF that is described in the sixth aspect or the communications apparatus that supports the VNF to implement the methods described in the second aspect, the third aspect and the fourth aspect.

Alternatively, the communications system includes the VNFM that is described in the ninth aspect or a communications apparatus that supports the VNFM to implement the method described in the first aspect, and the VNF that is described in the tenth aspect or a communications apparatus that supports the VNF to implement the methods described in the second aspect, the third aspect, and the fourth aspect.

In addition, for technical effects brought by the design manners of any one of the foregoing aspects, refer to technical effects brought by different design manners of the first aspect and the fourth aspect. Details are not described herein again.

In the embodiments of this application, names of the VNFM, the VNF, and the communications apparatus impose no limitation on the devices. In actual implementation, these devices may have other names. Provided that functions of each device are similar to those in the embodiments of this application, the devices fall within the scope of the claims of this application and their equivalent technologies thereof.

DESCRIPTION OF EMBODIMENTS

For clear and brief description of the following embodiments, a related technology is briefly described first.

A conventional telecommunications system includes various dedicated hardware devices, and different hardware devices are used for different applications. As a network scale grows, the telecommunications system becomes more complex, which brings many challenges, such as development and rollout of new services, system operation and maintenance, and resource utilization. To address these challenges and leverage virtualization and cloud computing technologies of the internet technology (IT) industry, at the Software-Defined Networking and OpenFlow World Congress (SDN and OF world congress) on Oct. 22, 2012, thirteen major telecommunications operators around the world jointly released a network function virtualization (NFV) white paper, and announced the establishment of an industry specific group (ISG) in the European Telecommunications Standards Institute (ETSI) to formulate NFV requirements and a technical framework, and promote NFV development.

An NFV technology can be simply understood as migrating functions of each network element used in a telecommunications network from a conventional dedicated hardware platform to a general commercial-off-the-shelf (COTS) server. The NFV technology converts each network element used in the telecommunications network into an independent application. The independent application may be flexibly deployed on a uniform infrastructure platform constructed based on a standard server, a storage device, a switch, and other devices. A virtualization technology implements resource pooling and virtualization on an infrastructure hardware device, provides a virtual resource for an upper-layer application, and decouples an application from hardware. In this way, virtual resources can be quickly added to each application to quickly increase a system capacity, or virtual resources can be quickly reduced to decrease a system capacity, greatly improving network resilience. With a shared resource pool formed by general COTS servers, no hardware device needs to be independently deployed for a newly developed service. Therefore, it significantly reduces time to launch the new service.

A basis of the NFV technology includes the cloud computing technology and the virtualization technology. The virtualization technology can be used to decompose universal COTS computing, storage, and network devices into various virtual resources for upper-layer applications to use. The virtualization technology implements decoupling the application from the hardware, so that the virtual resources are more quickly provided. The cloud computing technology can implement flexible scaling of the application, and match the virtual resources with service loads. This not only improves utilization of the virtual resources, but also increases a system response speed.

Figure 2:
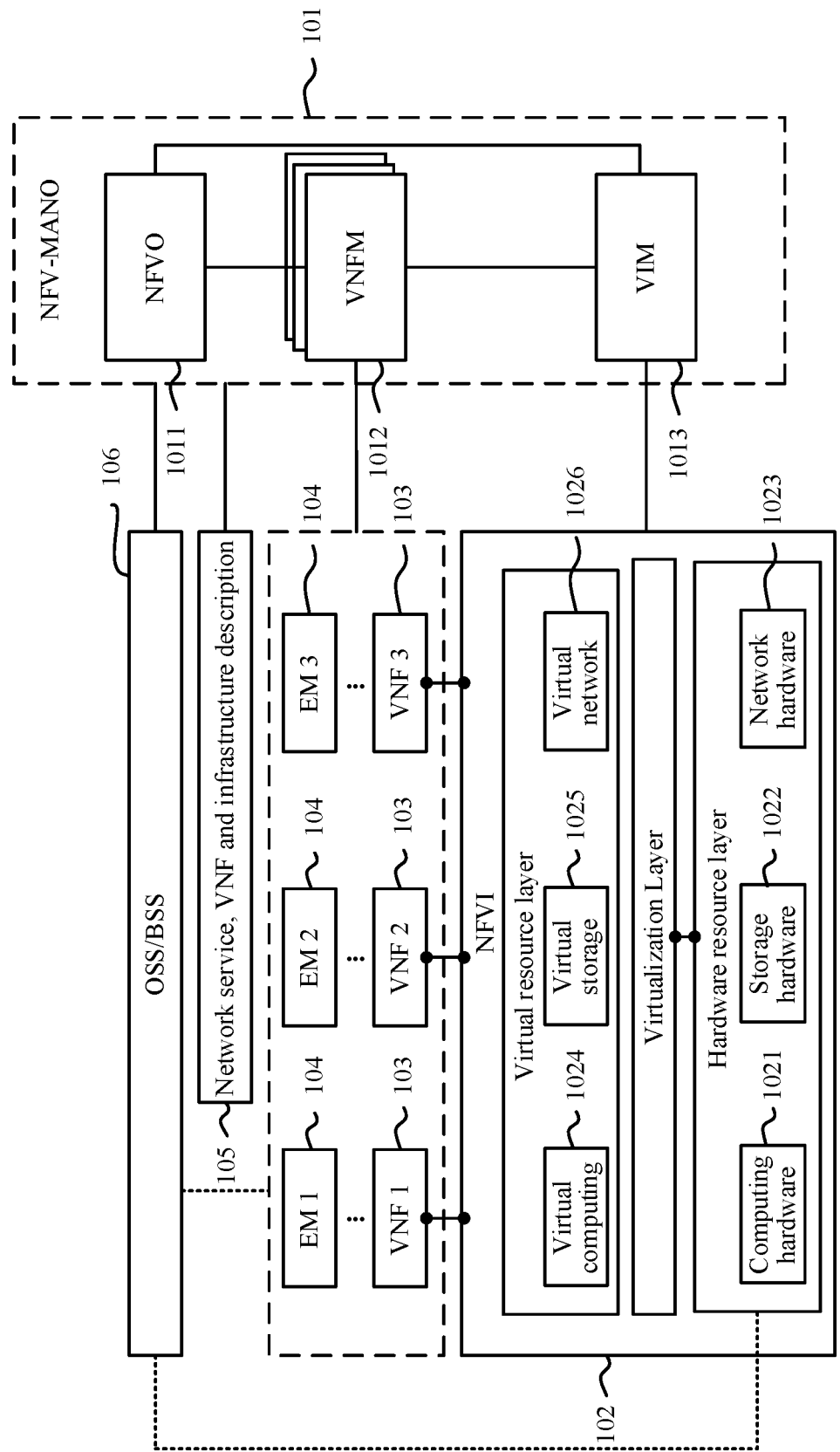
FIG. 2 is a diagram of an example of an NFV system architecture according to an embodiment of this application.

FIG. 2 is a diagram of an example of an NFV system architecture according to an embodiment of this application. The NFV system can be used in various networks, for example, implemented in a data center network, a telecom operator network, or a local area network. The NFV system includes an NFV management and orchestration (NFV MANO) 101, an NFV infrastructure (NFVI) 102, a plurality of virtual network functions (VNF) 103, a plurality of element management (EM) 104, a network service, VNF and infrastructure description 105, and an operation support system/business support system (OSS/BSS) 106.

The NFV MANO 101 is configured to monitor and manage the NFVI 102 and the VNF 103. The NFV management and orchestration system 101 includes an NFV orchestrator (NFVO) 1011, one or more VNF managers (VNFM) 1012, and a virtualized infrastructure manager (VIM) 1013. The NFVO 1011 may implement a network service (such as L2 and L3 VPN services) on the NFVI 102, or may execute a resource-related request from the one or more VNFMs 1012, send configuration information to the VNFM 1012, and collect status information of the VNF 103. In addition, the NFVO 1011 may communicate with the VIM 1013, to allocate and/or reserve a resource, and exchange configuration and status information of a virtualized hardware resource. The VNFM 1012 may manage one or more VNFs 103. The VNFM 1012 may perform various management functions, for example, instantiate, update, query, scale up and down, and/or terminate the VNF 103. The VIM 1013 may perform resource management functions, such as a function of managing infrastructure resource allocation (for example, adding a resource to a virtual container) and an operation function (for example, collecting NFVI fault information). The VNFM 1012 and the VIM 1013 may communicate with each other to allocate the resource and exchange the configuration and the status information of the virtualized hardware resource.

The NFVI 102 includes a hardware resource layer, a virtualization layer, and a virtual resource layer. The NFVI 102 includes a hardware resource, a software resource, or a combination of the hardware resource and the software resource, to complete deployment of a virtualized environment. In other words, the hardware resource and the virtualization layer are used to provide a virtual resource for the VNF 103, for example, the virtual resource is used as a virtual machine or a virtual container in another form. The hardware resource layer includes a computing hardware 1021, a storage hardware 1022, and a network hardware 1023. The computing hardware 1021 may be existing hardware in the market and/or customized hardware, and is configured to provide processing and computing resources. The storage hardware 1022 may be a storage capacity provided in a network or a storage capacity (a local memory in a server) of the storage hardware 1022. In an implementation solution, resources of the computing hardware 1021 and the storage hardware 1022 may be aggregated. The network hardware 1023 may be a switch, a router, and/or any other network device that is configured to provide a switching function. The network hardware 1023 may cross a plurality of domains, and may include a plurality of networks interconnected by one or more transport networks. The virtualization layer in the NFVI 102 may abstract the hardware resource from a physical layer and decouple from the VNF 103, to provide a virtualized resource to the VNF 103. The virtual resource layer includes virtual computing 1024, virtual storage 1025, and a virtual network 1026. The virtual computing 1024 and the virtual storage 1025 may be provided to the VNF 103 in a form of a virtual machine and/or another virtual container. For example, the one or more VNFs 103 may be deployed on one virtual machine (VM). The virtualization layer abstracts the network hardware 1023 to form the virtual network 1026. The virtual network 1026 may include a virtual switch, and the virtual switch is configured to provide a connection between the virtual machine and another virtual machine. In addition, the transport network of the network hardware 1023 may be virtualized by using a centralized control plane and an independent forwarding plane (for example, software-defined networking).

In terms of hardware, the computing hardware 1021, the storage hardware 1022, and the network hardware 1023 may include a plurality of subracks, a plurality of racks, or even a plurality of equipment rooms. In terms of software, there may be one VIM 1013 or a plurality of VIMs that separately manage different hardware resources.

The VNFM 1012 may interact with the VNF 103 and the EM 104 to manage a life cycle of the VNF and exchange the configuration and the status information. The VNF 103 may be configured as virtualization of at least one virtual network function performed by one physical network device. For example, in an implementation solution, the VNF 103 may be configured to provide functions of different network elements in an IP multimedia subsystem (IMS) network, such as a network function of a P-SCSCF, an S-CSCF, or an HSS. The EM 104 is configured to manage the one or more VNFs 103.

The network service, VNF and infrastructure description, and the operation support system/business support system are further discussed in the ETSI GS NFV 002 V1.1.1 standard.

Figure 1:
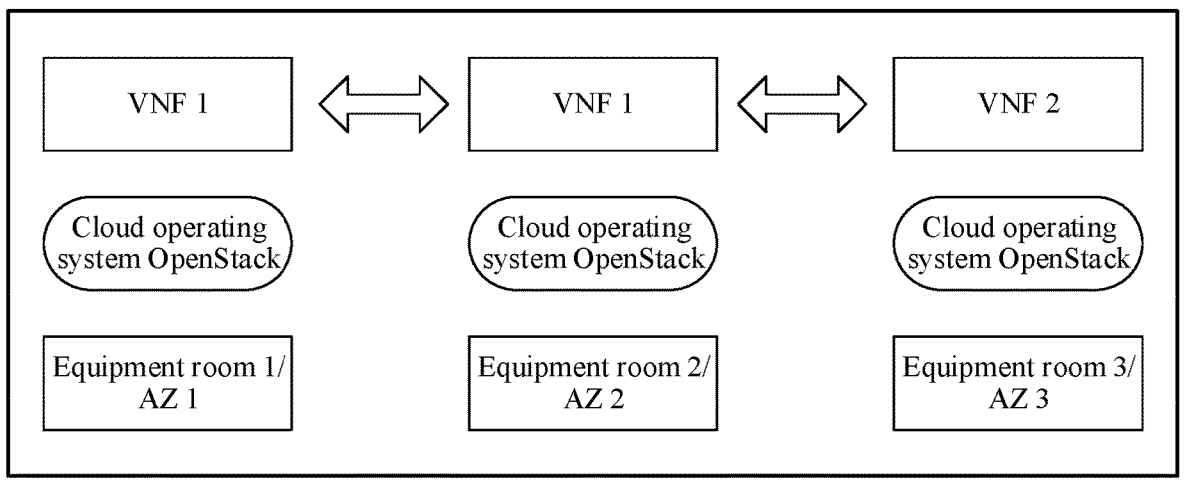
FIG. 1 is a diagram of example VNF deployment according to the prior art.

In a physical telecommunications network, functions of a same network element need to be deployed on different subracks or racks to ensure reliability. If a subrack or a rack is faulty, another subrack or rack can continue to provide a service. From the perspective of physical facilities, the subrack, the rack, or the equipment room can be defined as a fault domain (FD). Different users have different conditions. Some users consider the subrack as the fault domain (a single subrack fault does not affect a service), and some users consider the rack or the equipment room as the fault domain. In terms of software, the NFV system includes a plurality of VIM instances and a single VIM instance. A single VIM is further divided, for example, a management unit may be an AZ or an HA on an OpenStack. One management unit may correspond to one fault domain, and a capacity of the management unit may be preset based on a capacity of the fault domain. When a VNF is deployed in the NFV system, to improve data reliability and network reliability, VNFs with a same function may be deployed on a plurality of management units. For example, a deployment manner is shown in FIG. 1. An infrastructure on which VNF deployment and operation depend is increasingly planned toward a data center (DC). The data center may include a plurality of traditional equipment rooms located in different geographical locations. A capacity of a management unit is set based on a capacity of an equipment room, to maximize the value of the traditional equipment room and reduce the costs of constructing a new large-scale data center. When one management unit is faulty, other management units may still provide a service. In other words, when one equipment room is faulty, other equipment rooms may still provide the service. However, a VNFD is required for deploying each VNF. In the foregoing VNF deployment scenario, there are a large quantity of VNFDs that incur high maintenance and management costs. In addition, if the equipment room is faulty, it is costly to ensure service continuity.

An embodiment of this application provides a virtual network function deployment method. A basic principle of the method is as follows: First, a VNFM obtains a VNFD, and obtains N management unit identifiers entered by a user. The VNFD includes input parameter information, input adaptation information, and virtual network function VNF descriptor information. The input parameter information includes N pieces of management unit information. Each piece of management unit information is used to describe an attribute of a management unit. The attribute of the management unit includes a type and a name of the management unit. The input adaptation information is used to indicate a mapping relationship between the management unit and a logical management unit. The VNF descriptor information is used to indicate to deploy a VNF on N logical management units, where N is an integer greater than or equal to 2. A capacity of the management unit corresponding to a management unit identifier is the same as a capacity of a failure domain corresponding to the management unit. In other words, a subrack, a rack, or an equipment room is mapped as a management unit in an NFV system. One management unit may correspond to one fault domain. Then, the VNFM maps, based on the input adaptation information, management units corresponding to the N management unit identifiers to the N logical management units, and creates the VNF on the N logical management units based on the VNF descriptor information.

According to the virtual network function deployment method provided in this embodiment of this application, when one VNF is deployed on the N management units, the VNFM may map the management units corresponding to the N management unit identifiers to the N logical management units based on the input adaptation information included in a preconfigured VNFD. The VNFM suppresses a fault domain difference, exposes only an abstracted and unique logical management unit to the VNF, and deploys the VNF on more than two logical management units. In other words, this implements VNF deployment on a plurality of management units, which is equivalent to that this implements the VNF deployment in a plurality of fault domains. In this way, data reliability and network reliability are improved, internal processing of VNF software is unified, a quantity of VNFDs is reduced, complexity caused by a plurality of solutions is avoided, and software version adaptability is enhanced.

The following describes implementations of the embodiments of this application in detail with reference to accompanying drawings.

Figure 3:
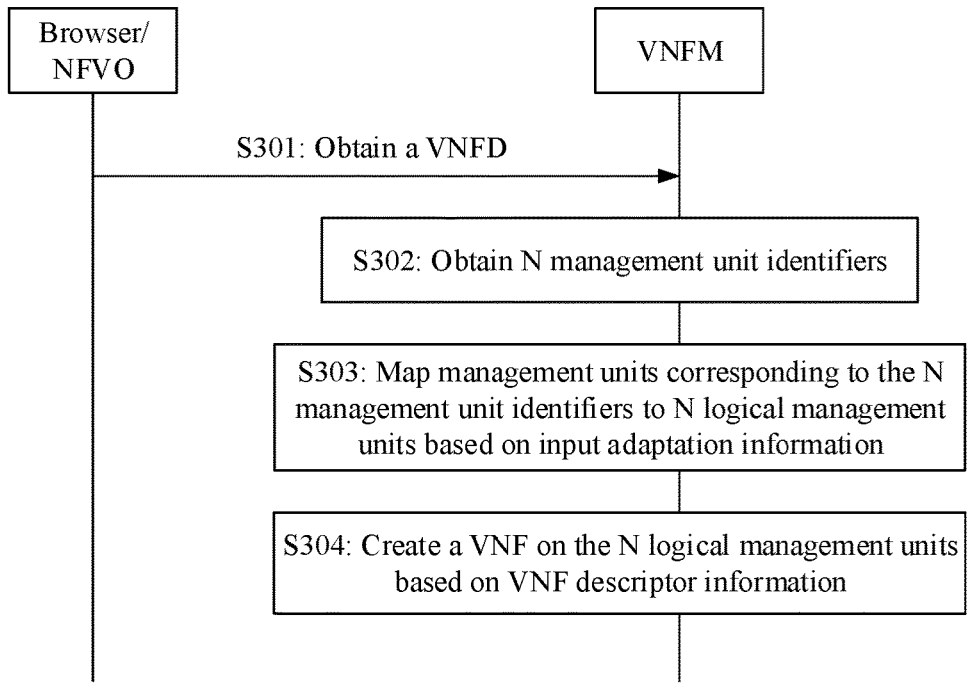
FIG. 3 is a flowchart of a virtual network function deployment method according to an embodiment of this application.

FIG. 3 is a flowchart of a virtual network function deployment method according to an embodiment of this application. As shown in FIG. 3, the method may include the following steps.

S301: The VNFM obtains the VNFD.

The VNFM may obtain the VNFD from an NFVO, and the NFVO pre-stores the VNFD. The VNFM may alternatively obtain the VNFD from a browser. The VNFD is a configuration template that describes a deployment and operation action of a VNF module. The VNFD is used for a running process of the virtual network functional module and life cycle management of an instance of the virtual network functional module.

In the prior art, a deployment location of a virtual machine is determined by the VNFM based on a VNFD definition and a user input parameter. For example, if a cloud operating system is OpenStack, and the management unit is an AZ, the VNFD is as follows:

inputs:
  AZ:
    type: string
    description: Availability zone
    default: az1.dc1
IMS_VNF:
type: VNFD.node.VNF
properties:
  dc_id: FS:Service_VPC
  az_id: {get_input: AZ}

In the preceding information, description indicates description of the input parameter AZ, which is used to display a meaning of the input parameter AZ in a user interface. A value of default is a default value of the input parameter AZ, which can be configured in an NFV management and orchestration interface based on site environment information. A value of az_id is associated with an AZ node in an input parameter inputs. For example, if the AZ used for the VNF deployment is az1.dc1.

The VNFD in this embodiment of this application includes the input parameter information, the input adaptation information, and the VNF descriptor information.

The input parameter includes the management unit, the cloud operating system, and storage. For example, the management unit may be the foregoing AZ or HA. For example, the cloud operating system may be the foregoing OpenStack. The input parameter information includes the N pieces of management unit information, M pieces of cloud operating system information, and storage information. Each of the N pieces of management unit information is used to describe the attribute of the management unit. The attribute of the management unit includes the type and the name of the management unit. The attribute of the management unit may further include a default value of the management unit. Each of the M pieces of cloud operating system information is used to describe an attribute of the cloud operating system. The attribute of the cloud operating system includes a type and a name of the cloud operating system. The attribute of the cloud operating system may further include a default value of the cloud operating system. The storage information is used to describe a storage attribute. The storage attribute includes a storage type and a storage name. The storage attribute may further include a default value of the storage. M is an integer greater than or equal to 1.

The input adaptation information is used to indicate the mapping relationship between the management unit and the logical management unit. The input adaptation information is further used to indicate a mapping relationship between the cloud operating system and the logical management unit.

The VNF descriptor information is used to indicate to deploy the VNF on the N logical management units, where N is the integer greater than or equal to 2.

For example, if the cloud operating system is OpenStack, and the management unit is the AZ, the VNFD is as follows:
inputs:
AZ1:
  type: string
  description: Availability zone
  default: "az1"
AZ2:
  type: string
  description: Availability zone
  default: "az2"
input_adapter:
location1:
  adapter_AZ:{get_input: AZ1}
location2:
  adapter_AZ:{get_input: AZ2}
IMS_VNF:
type: VNFD.node.VNF
properties:
  az_id: {get_input: AZ}

In the preceding information, inputs indicates the input parameter. type indicates the type of the management unit. description indicates the name of the management unit. default indicates the default value of the management unit. input_adapter indicates the input adaptation information. location indicates the logical management unit. adapter_AZ:{get_input: AZ1} indicates that a management unit corresponding to a management unit identifier AZ 1 entered by the user is mapped to a logical management unit AZ. Similarly, adapter_AZ:{get_input:AZ2} indicates that a management unit corresponding to a management unit identifier AZ 2 entered by the user is mapped to the logical management unit AZ. IMS_VNF indicates the VNF descriptor information.

It should be noted that different granularities of the fault domain may be selected when different locations are associated with different fault domains. For example, a VIM, the AZ on the OpenStack, and the HA on the OpenStack can be used to configure a network and storage for each location. P S302: The VNFM obtains the N management unit identifiers.

Figure 4:
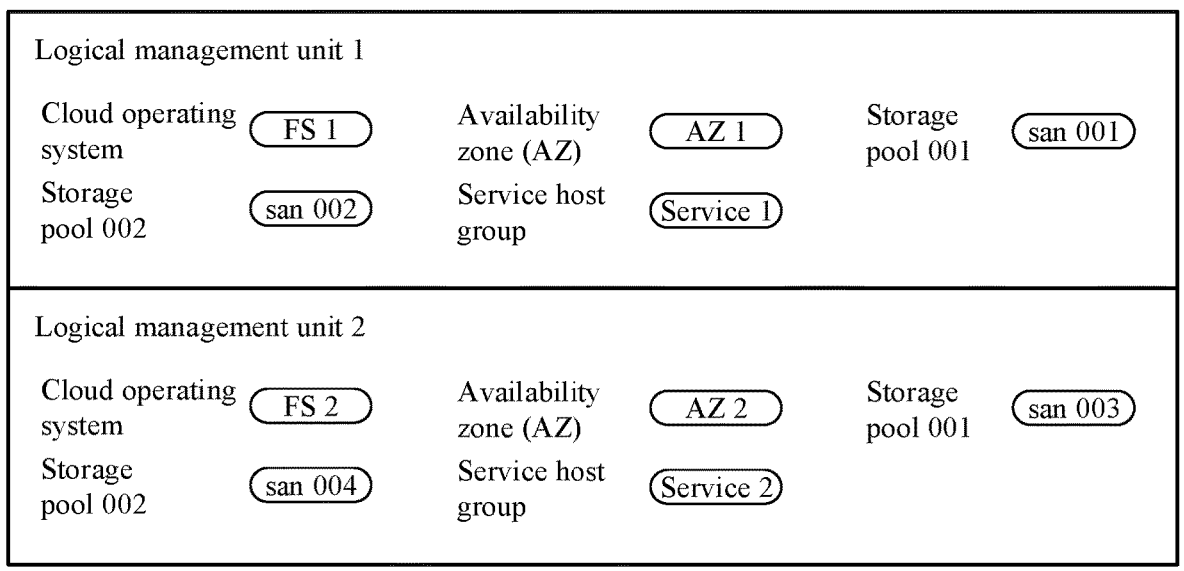
FIG. 4 is a diagram of an example of a logical management unit interface according to an embodiment of this application.

A correspondence between the capacity of the management unit corresponding to the management unit identifier and the capacity of the fault domain corresponding to the management unit is preset on the NFV system. The user may select a required fault domain according to a correspondence between the management unit and the fault domain, and enter the management unit identifier of the management unit corresponding to the fault domain in a VNFM interface. In this way, the VNFM can obtain the management unit identifier entered by the user. For example, as shown in FIG. 4, location 1 indicates a logical management unit 1. Location 2 indicates a logical management unit 2. Cloud service indicates the name of the cloud operating system, and FS1 indicates a default identifier of the cloud operating system. Availability zone indicates the name of (applicable to) the management unit. AZ1 indicates a default identifier of the management unit. Storage pool001 indicates a name of a storage device 1. Storage pool002 indicates a name of a storage device 2. Service HA indicates the name of the management unit (a service host group). Service 1 indicates the default identifier of the management unit. Cloud service may also be considered as the VIM. For example, enter FS1 for cloud service at location1, and enter FS2 for cloud service at location 2. If a same VIM is used, enter the same VIM. If the same VIM and the same availability zone are used, but a different HA is used, enter an HA name of the OpenStack at service HA.

Optionally, the management units corresponding to the N management unit identifiers belong to M cloud operating systems corresponding to M cloud operating system identifiers. When M=1, the management units all belong to a management unit on a same cloud operating system. When M=2, the N management units belong to management units on two cloud operating systems. For example, when M=2 and N=2, two management units may belong to two different cloud operating systems. The user can enter different cloud operating system identifiers in the VNFM interface.

Figure 5:
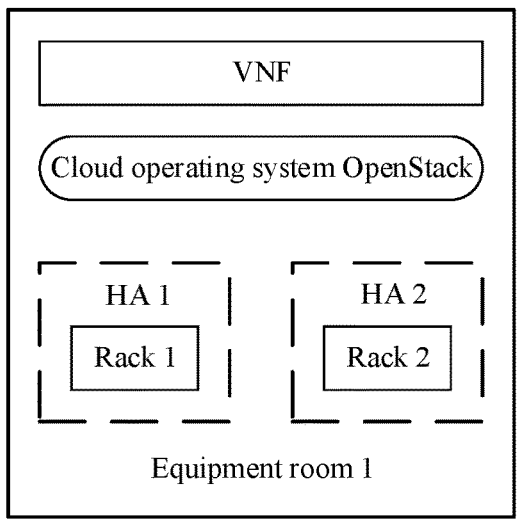
FIG. 5 is a diagram of an example of a scenario of deploying a virtual network function according to an embodiment of this application.
Figure 5:
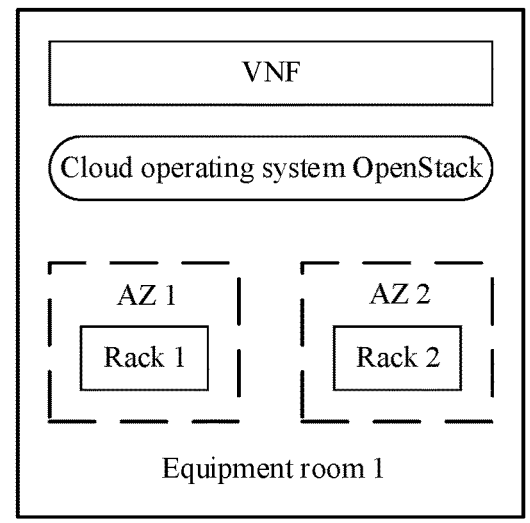
Figure 5:
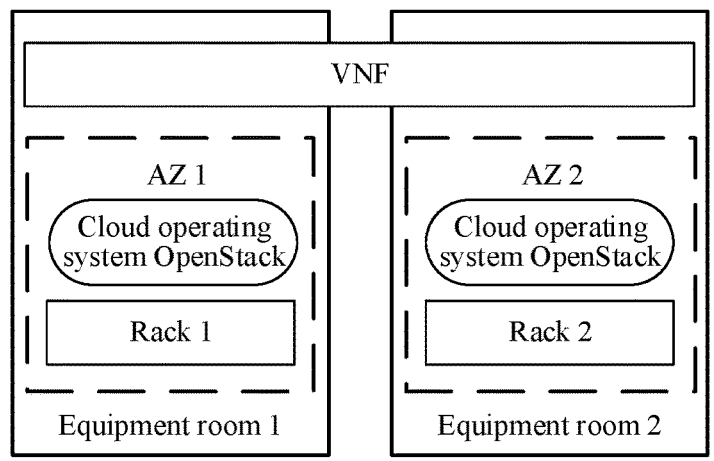
Figure 5:
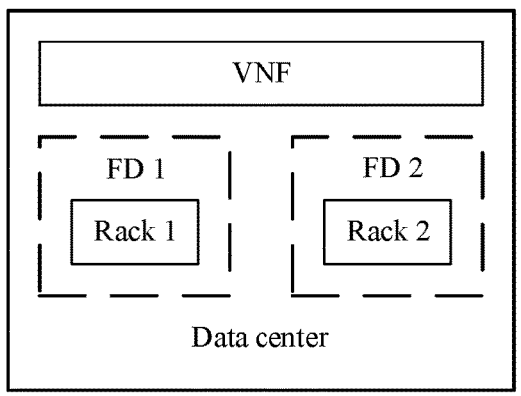
Figure 5:
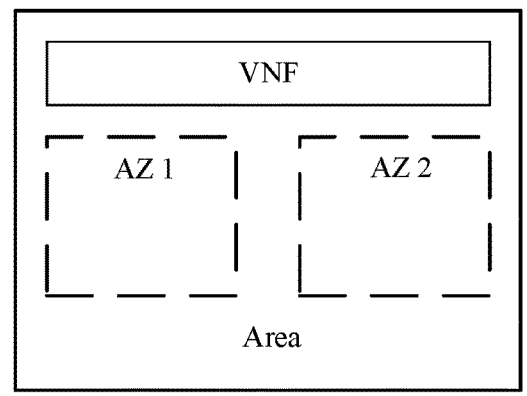

For example, the VNF deployed according to the VNF deployment method in this embodiment of this application is described as an example. As shown in scenario 1 to scenario 5 in FIG. 5, a physical facility is mapped to a management unit visible to the VNF. An example is as follows:

Scenario 1: A rack is mapped to an HA on the OpenStack, and a VNF is deployed on a plurality of HAs. In this way, the VNF is deployed across the plurality of HAs, in other words, the VNF is deployed across a plurality of racks.

Scenario 2: A rack is mapped to an AZ on the OpenStack, and a VNF is deployed on a plurality of AZs. In this way, the VNF is deployed across the plurality of AZs, in other words, the VNF is deployed across a plurality of racks.

Scenario 3: An equipment room is mapped to an OpenStack instance, and a VNF is deployed on a plurality of OpenStack systems. In this way, the VNF is deployed across the plurality of OpenStack systems, in other words, the VNF is deployed across a plurality of equipment rooms.

Scenario 4: A Microsoft cloud (Azure) maps one or more racks to a fault domain, and a VNF is deployed in a plurality of fault domains. In this way, the VNF is deployed across the fault domains, in other words, the VNF is deployed across a plurality of racks.

Scenario 5: Amazon web services (Amazon web services, AWS) map one or more equipment rooms to one AZ, and a VNF is deployed in a plurality of AZs. In this way, the VNF is deployed across the AZs, in other words, the VNF is deployed across a plurality of equipment rooms.

S303: The virtualized network function manager maps the management units corresponding to the N management unit identifiers to the N logical management units based on the input adaptation information.

For a fault domain at any granularity level, the management units corresponding to the N management unit identifiers may be mapped to the N logical management units based on the input adaptation information included in the VNFD.

S304: The VNFM creates the VNF on the N logical management units based on the VNF descriptor information.

Figure 6:
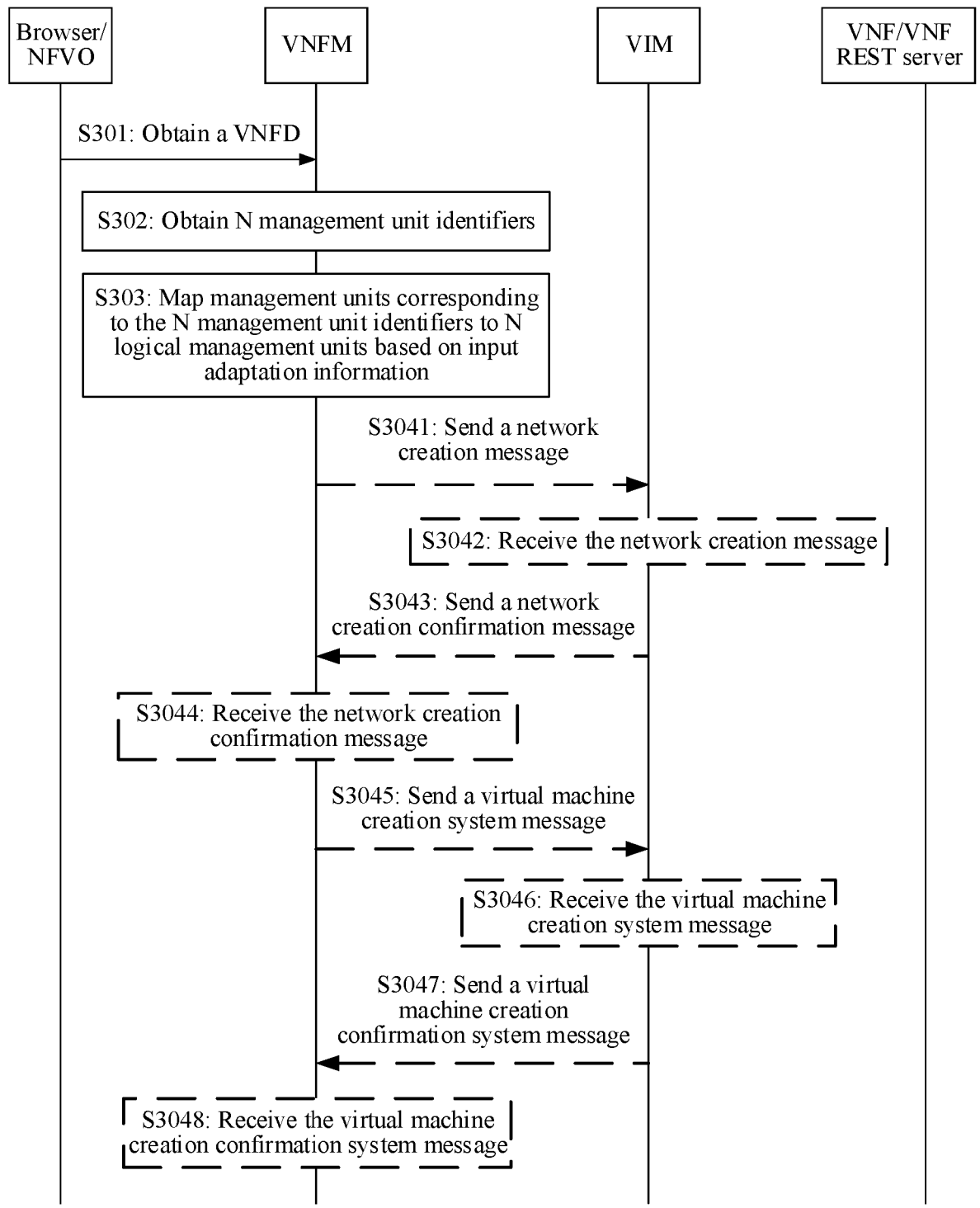
FIG. 6 is a flowchart of another virtual network function deployment method according to an embodiment of this application.

As shown in FIG. 6, the method in which the VNFM creates the VNF on the N logical management units based on the VNF descriptor information includes the following steps:

S3041: The VNFM sends a network creation message to the VIM.

The network creation message is used to indicate the VIM to allocate a resource required for creating the VNF. An NFVI resource is allocated to the VNF based on a requirement (including a resource allocation criteria) obtained from the VNFD, but a specific requirement, a constraint, and a policy provided in advance or provided with a request are also considered.

S3042: The VIM receives the network creation message sent by the VNFM.

S3043: The VIM sends a network creation confirmation message to the VNFM.

S3044: The VNFM receives the network creation confirmation message sent by the VIM.

S3045: The VNFM sends a virtual machine creation system message to the VIM.

The virtual machine creation system message includes a central processing unit capacity, a memory capacity, and a disk capacity that are required for creating the VNF.

S3046: The VIM receives the virtual machine creation system message sent by the VNFM.

S3047. The VIM sends a virtual machine creation confirmation system message to the VNFM.

S3048: The VNFM receives the virtual machine creation confirmation system message sent by the VIM.

For explanations of creating the VNF on the N logical management units based on the VNF descriptor information by the VNFM, refer to the prior art. Details are not described herein in this embodiment of this application.

According to the virtual network function deployment method provided in this embodiment of this application, when one VNF is deployed on the N management units, the VNFM may map the management units corresponding to the N management unit identifiers to the N logical management units based on the input adaptation information included in the preconfigured VNFD. The VNFM suppresses the fault domain difference, exposes only an abstracted and unique logical management unit to the VNF, and deploys the VNF on more than two logical management units. In other words, this implements the VNF deployment on a plurality of management units, which is equivalent to that this implements the VNF deployment in a plurality of fault domains. In this way, the data reliability and the network reliability are improved, the internal processing of VNF software is unified, a quantity of VNFDs is reduced, the complexity caused by a plurality of solutions is avoided, and the software version adaptability is enhanced.

Figure 7:
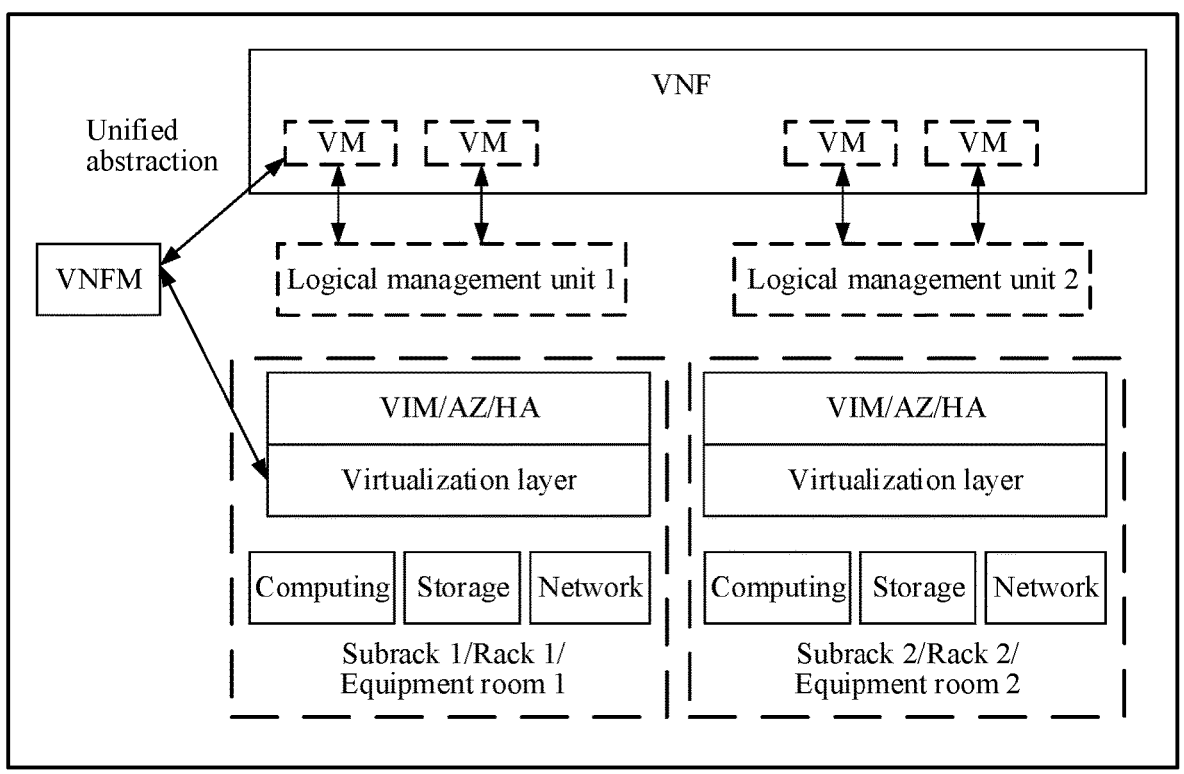
FIG. 7 is a diagram of example virtual network function deployment according to an embodiment of this application.

FIG. 7 is a diagram of VNF deployment according to an embodiment of this application. Two logical management units are abstracted from management units. Each of the two logical management units includes two virtual machines. The two logical management units are configured to implement a function of a VNF. Each logical management unit may be a VIM, an AZ, or an HA in an NFV system. In addition, each logical management unit corresponds to a subrack, a rack, or an equipment room in terms of hardware.

Figure 8:
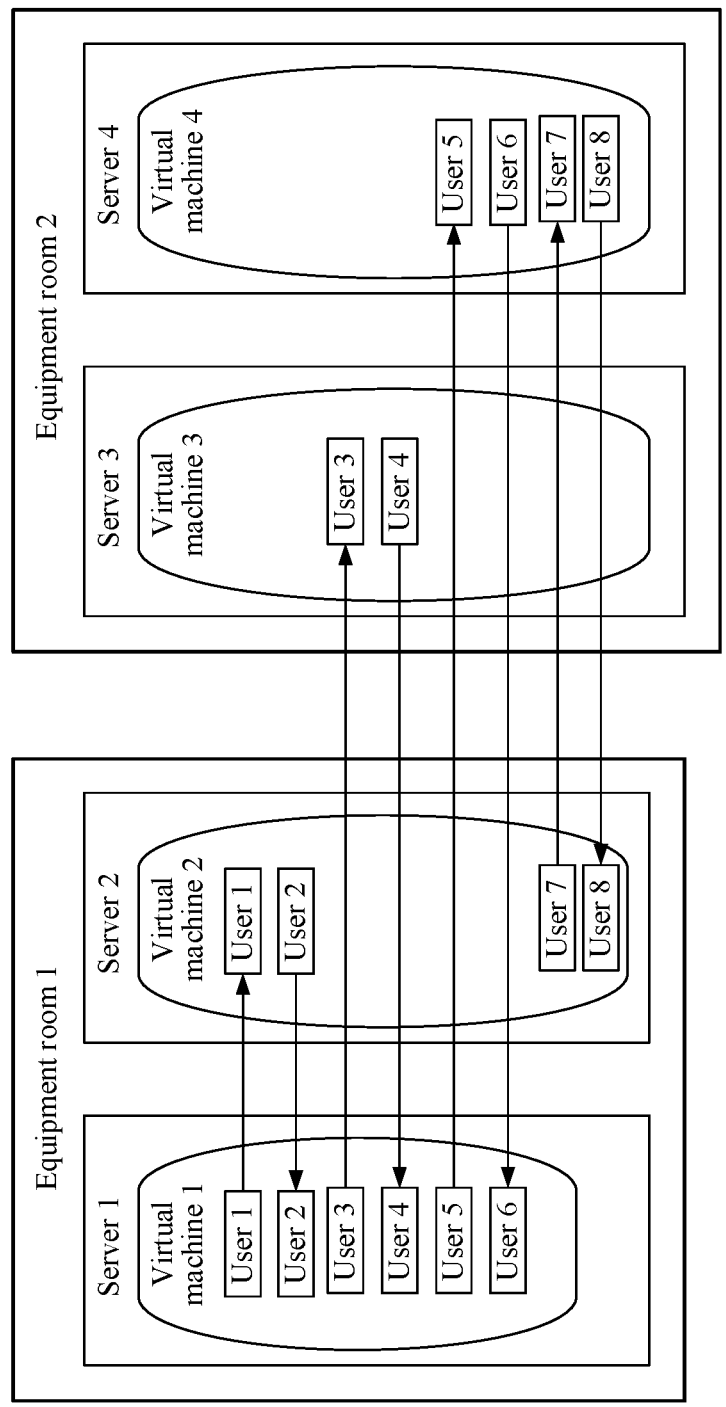
FIG. 8 is a diagram of an example of data storage according to the prior art.

Generally, carrier-class communications devices have high requirements. For example, if a single point of failure occurs, it is required that no data is lost. Therefore, active data and backup data need to be stored in different fault domains. For example, as shown in FIG. 8, when active data and backup data of a user 1 and active data and backup data of a user 2 are both stored in an equipment room 1, after the equipment room 1 is faulty, both the active data and the backup data of the user 1 and the active data and the backup data of the user 2 are lost.

Both the active data and the backup data may be generated during a running process of the VNF. Therefore, VNF software in a running state needs to correspond to a fault domain. For example, the equipment room 1 is a fault domain, and an equipment room 2 is a fault domain. Therefore, the active data can be stored in the equipment room 1, and the backup data can be stored in the equipment room 2.

However, all virtual machines in a current database are in an active state and work in a full load-sharing mode. As a result, the active data and the backup data cannot be stored based on the active state or a standby state of the virtual machines. In the prior art, because an association relationship between a VM and an AZ cannot be automatically obtained, the VNF software in the running state cannot store the active data and the backup data in the different fault domains.

Although the active data and the backup data may be backed up in different management units according to the deployment manner shown in FIG. 1, complexity and costs are high.

To separately deploy a primary virtual machine and a secondary virtual machine in the different fault domains by using a location in this embodiment of this application, in other words, the primary virtual machine is deployed in one location, and the secondary virtual machine is deployed in another location. A load-sharing virtual machine may be evenly deployed in different locations. In this way, the virtual machines may be deployed in the different fault domains. Deployment across the management units improves reliability. A virtual machine requirement may be clearly described in the VNFD, and the VNFM generates the virtual machine based on the VNFD.

In addition, the VNFM transfers a correspondence between each of the N logical management units and a virtual machine to the VNF. When the VNF is running, the VNF detects a mapping relationship between the logical management unit and the virtual machine. When storing the active data and the backup data, the VNF can dynamically select virtual machines of different logical management units to store data. In this way, if a single management unit is faulty, the data can still be stored in another management unit. This improves reliability.

Figure 9:
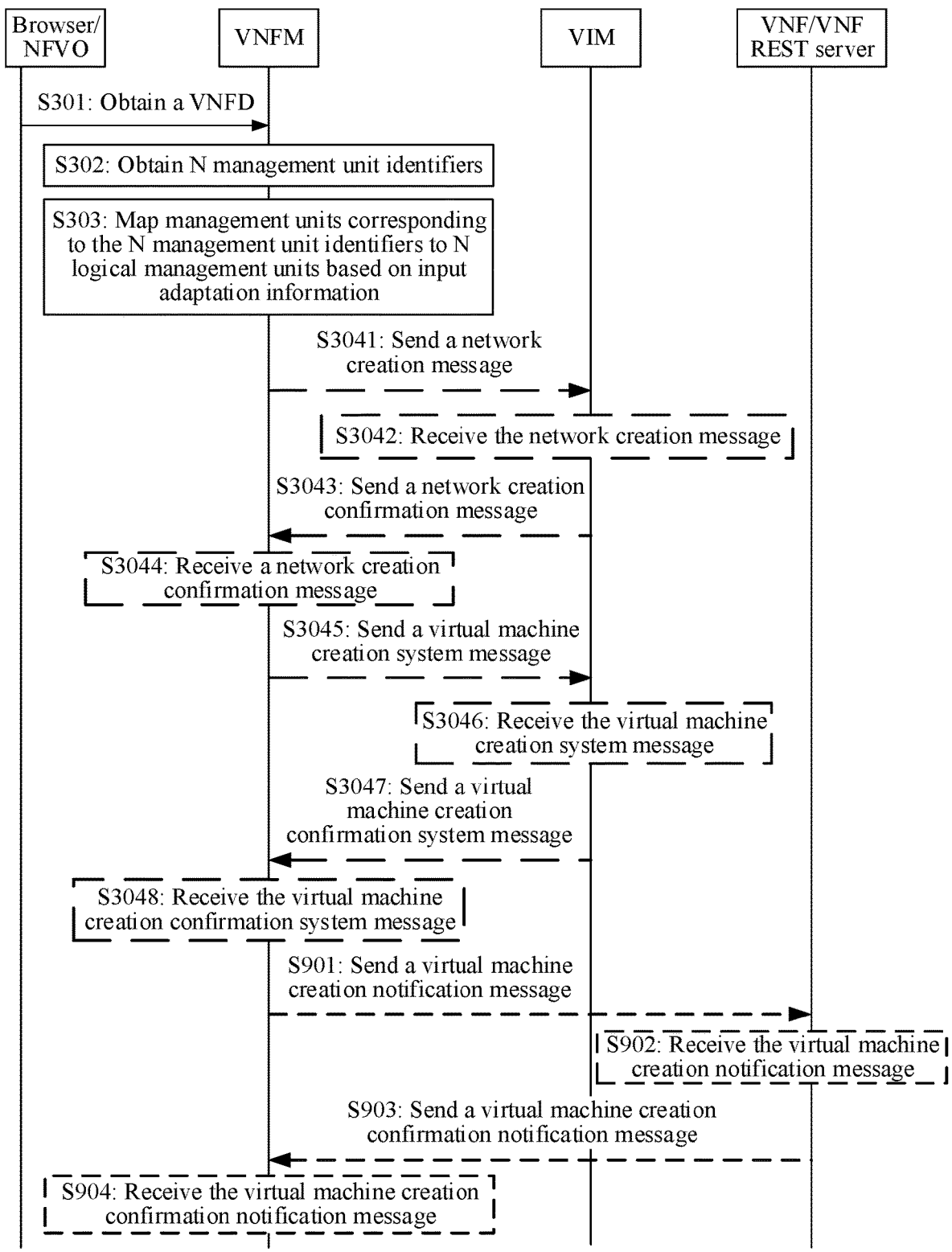
FIG. 9 is a flowchart of still another virtual network function deployment method according to an embodiment of this application.

For example, after the VNFM receives the virtual machine creation confirmation system message sent by the VIM, as shown in FIG. 9, the method further includes the following steps:

S901: The VNFM sends a virtual machine creation notification message to the VNF.

The virtual machine creation notification message includes the correspondence between each of the N logical management units and the virtual machine. For example, one management unit includes a quantity of virtual machines. VNF REST server is equivalent to an external interface of the VNF.

S902: The VNF receives the virtual machine creation notification message sent by the VNFM.

S903: The VNF sends a virtual machine creation confirmation notification message to the VNFM.

S904: The VNFM receives the virtual machine creation confirmation notification message sent by the VNF.

Certainly, the VNFM may further send the correspondence between each of the N logical management units and the virtual machine to the VNF through the network creation message.

In this way, the VNF software in the running state can detect a fault domain, so that the VNF can store the active data in a subrack (or a rack, or an equipment room), and store the backup data in another subrack (or another rack, or another equipment room). A fault domain notification interface is to be added between the VNFM and the VNF.

Figure 10:
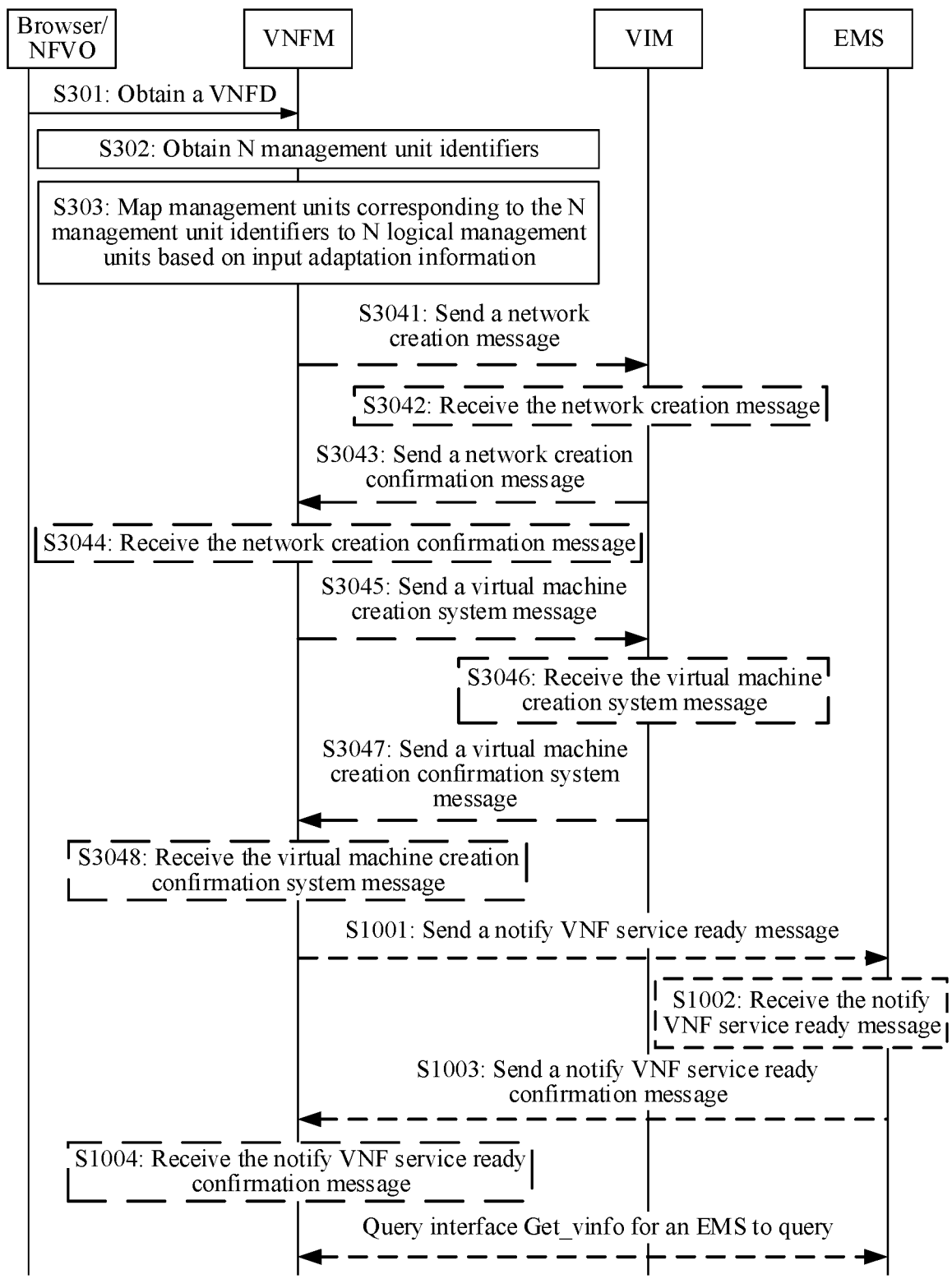
FIG. 10 is a flowchart of yet another virtual network function deployment method according to an embodiment of this application.

In addition, the VNFM may alternatively send the correspondence between each of the N logical management units and the virtual machine to an element management system through a notify VNF service ready message. In addition, the VNFM opens a query interface (for example, Get_vinfo) for the EMS to query. For example, after the VNFM receives the virtual machine creation confirmation system message sent by the VIM, as shown in FIG. 10, the method further includes the following steps:

S1001: The VNFM sends the notify VNF service ready message to the EMS.

The notify VNF service ready message includes the correspondence between each of the N logical management units and the virtual machine. For example, one logical management unit includes a quantity and types of virtual machines.

S1002: The EMS receives the notify VNF service ready message sent by the VNFM.

S1003: The EMS sends a notify VNF service ready confirmation message to the VNFM.

S1004: The VNFM receives the notify VNF service ready confirmation message sent by the EMS.

In the prior art, if an internal communications network in an equipment room is interrupted, it is necessary to arbitrate which equipment room is operating and which equipment room is not operating. This avoids simultaneous operating and prevents service loss. In the industry, an odd quantity of arbitration nodes is usually required. For example, arbitration nodes are separately deployed in three fault domains. However, in an actual environment, there is also a scenario of two fault domains. For example, when the VNF is deployed according to the virtual network function deployment method provided in this embodiment of this application, two logical management units are created. If one of the two logical management units is faulty, how to arbitrate the two logical management units is an urgent problem to be resolved.

Figure 11:
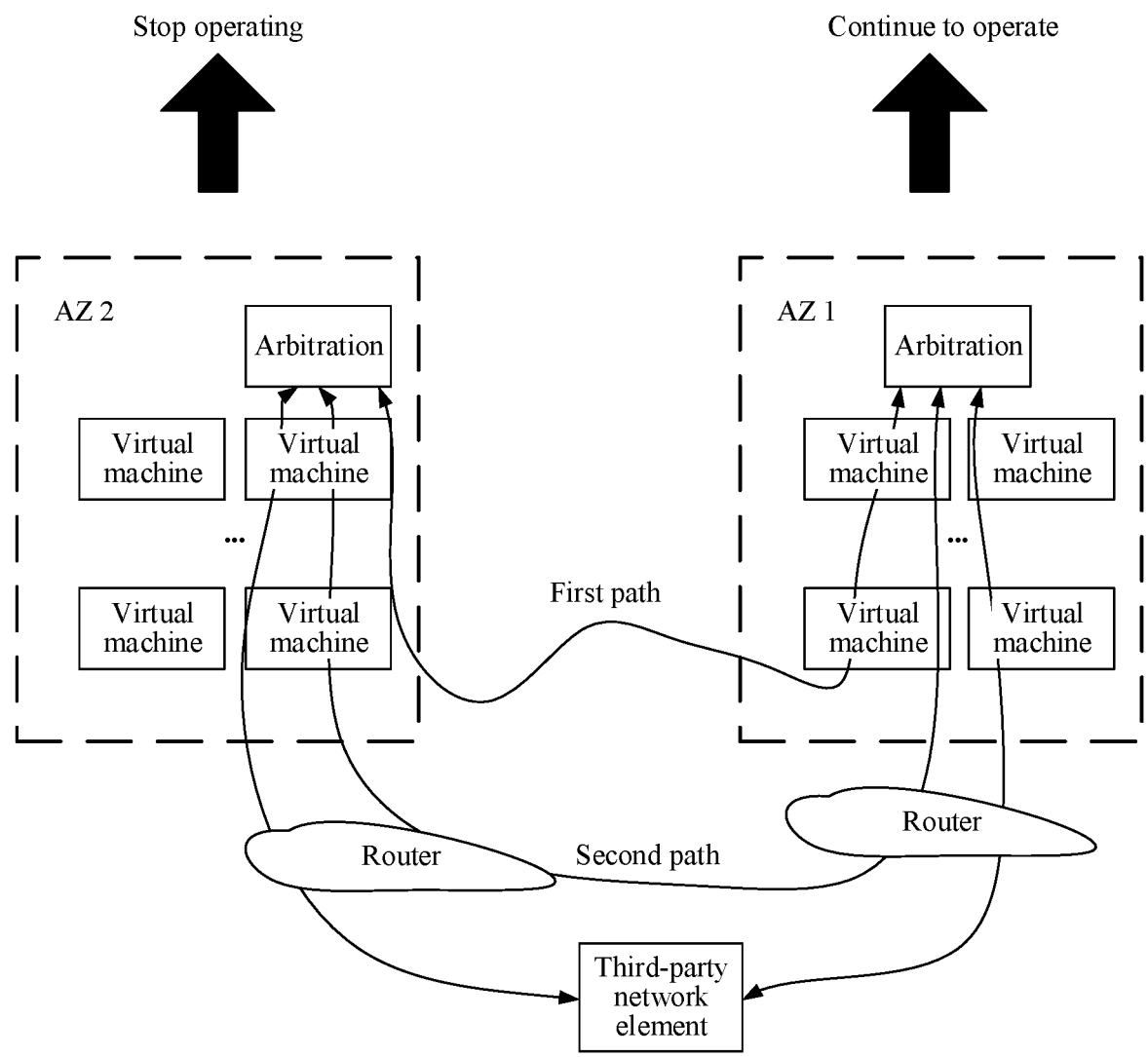
FIG. 11 is a diagram of an example of path detection method according to an embodiment of this application.

For the foregoing requirements, an embodiment of this application provides a method, in which detection and negotiation are performed on a plurality of paths between logical management units, and two logical management units send a KeepAlive message to an external application deployed at a third-party site. It is assumed that the logical management unit is an AZ, as shown in FIG. 11.

1. A periodic detection is performed in an internal communications network. The internal communications network is used to carry communication traffic between internal modules and between services of a VNF. For example, a first path shown in FIG. 11 is an internal path between the two logical management units that carry the VNF. A VNFS periodically detects the first path. If the first path is faulty, the VNFS detects a second path.

2. Negotiation with an external service network. For example, the second path shown in FIG. 11 is an external path between the two logical management units that carry the VNF. AZs of the VNF detect and negotiate with each other through a heartbeat message. If the second path is normal, the VNF selects any one logical management unit of the two logical management units that carry the VNF, to provide a service to the outside, and the other logical management unit in the two logical management units stops operating. For example, if the VNF can normally communicate with the external service network, the VNF selects one AZ through negotiation to provide the service to the outside, and the other AZ stops operating. If the second path is abnormal, third-party detection is performed.

3. Third-party detection: The VNFS detects a path of a first logical management unit of the two logical management units that carry the VNF by using a third-party network element, and detects a path of a second logical management unit that carries the VNF by using the third-party network element; the VNFS determines that a logical management unit whose path to the third-party network element is normal provides the service to the outside; and the VNFS determines that a logical management unit whose path to the third-party network element is faulty stops operating. In other words, a service node, for example, a third-party application deployed on the third party network element is selected. Heartbeats (for example, using link heartbeats and service heartbeats) are configured between the third-party application and each AZ. If the third-party application is reachable, the AZ is active. If both the detected first path and the detected second path are unreachable, and the third-party application is unreachable, the AZ is not operating.

In addition, if the VNF is deployed across equipment rooms, communication traffic between internal modules or services of the VNF is exposed to the equipment rooms. As a result, a communication distance is prolonged, and communication between the equipment rooms may be interrupted due to municipal construction. If a network device in an equipment room is in a sub-health state, for example, if a packet loss rate is 30%, it cannot be detected at a VNF layer. If no detection solution is deployed at an infrastructure layer, services may be continuously affected. The VNF cannot automatically locate a fault, detect a sub-healthy virtual machine, or perform self-healing. If a detection solution is deployed at the infrastructure layer, a point of failure can be calculated based on an infrastructure topology. In this scenario, it is necessary to know a networking topology. However, usually the networking topology cannot be detected, and therefore the problem cannot be resolved at the VNF layer.

The sub-health state does not mean that the system cannot properly operate. For example, if a switch in the network is faulty, 30% of message packets are randomly discarded. As a result, a part of the service may fail. A normal heartbeat detection solution cannot be used to determine the switch with packet loss. In this embodiment of this application, a management unit may be used to locate a network sub-health problem. For example, statistics are collected on a packet loss rate of communication between virtual machines within a management unit and a packet loss rate of virtual machine communication between management units, and then a communication matrix is analyzed, and a key determining condition is extracted, to locate a sub-healthy management unit.

In this embodiment of this application, an abnormal virtual machine in a $j^{th}$ logical management unit is determined by using a data packet between virtual machines in the $j^{th}$ logical management unit in the two logical management units that carry the VNF, where j is a positive integer, and j ranges from 1 to N.

Figure 12:
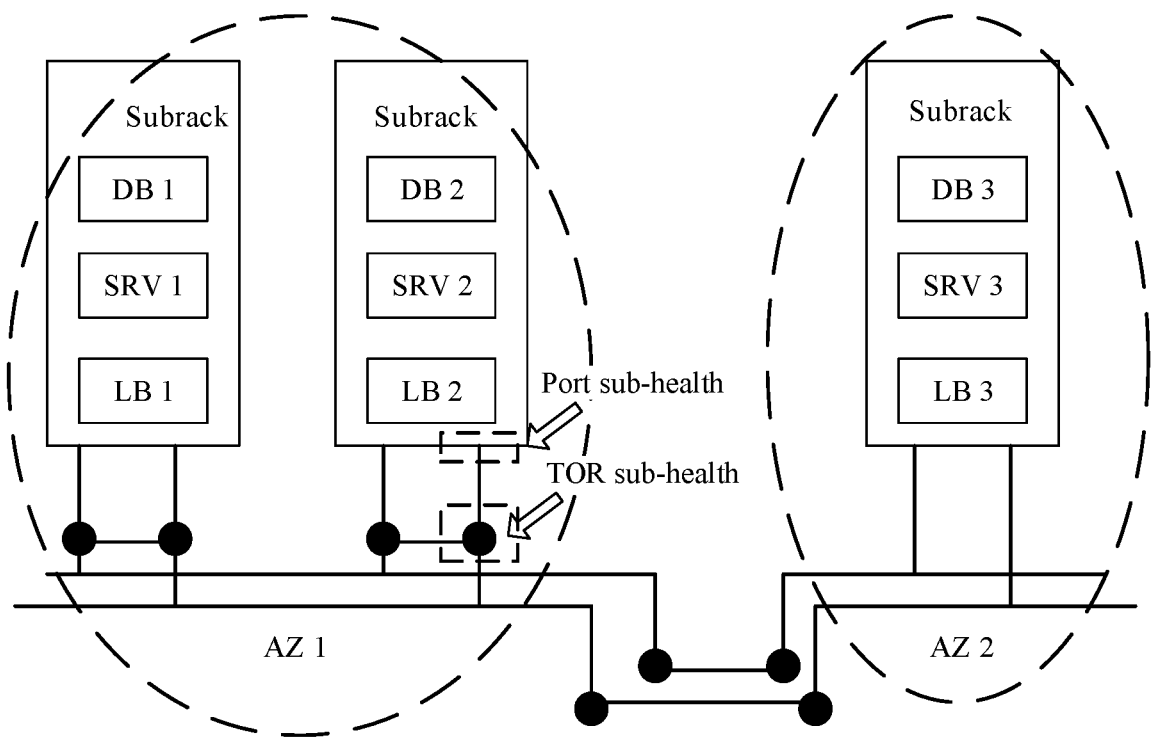
FIG. 12 is a diagram of an example of another path detection method according to an embodiment of this application.

For example, FIG. 12 shows a scenario of communication sub-health in the AZ when it is assumed that the logical management unit is the AZ. Table 1 shows a communication matrix of an AZ 1. Table 2 shows a communication matrix of an AZ 2.

TABLE 1

| | AZ 1 | | | |
|---|---|---|---|---|
| Virtual machine name | Whether packet loss occurs in the AZ 1 | Percentage of virtual machines with the packet loss in the AZ 1 | Whether packet loss occurs in the AZ 2 | Percentage of virtual machines with the packet loss in the AZ 2 |
| Load balancer LB 1 | Yes | 10% | No | 0 |
| Service processing module SRV 1 | Yes | 10% | No | 0 |
| Load balancer LB 2 | Yes | 30% | Yes | 70% |
| Service processing module SRV 2 | Yes | 30% | Yes | 70% |

TABLE 2

| | AZ 1 | | | |
|---|---|---|---|---|
| Virtual machine name | Whether packet loss occurs in the AZ 2 | Percentage of virtual machines with the packet loss in the AZ 2 | Whether packet loss occurs in the AZ1 | Percentage of virtual machines with the packet loss inthe AZ1 |
| Load balancer LB 3 | No | 0 | Yes | 20% |
| Service processing module SRV 3 | No | 0 | Yes | 20% |
| Database DB 3 | No | 0 | Yes | 20% |

Based on statistics of key information in Table 1 and Table 2, for example, communication between virtual machines in the AZ 2 is normal; communication between some virtual machines in the AZ 1 is normal, and packet loss occurs during the communication between some virtual machines in the AZ 1; communication between some virtual machines in the AZ 1 and the AZ 2 is normal, and packet loss occurs during the communication between some virtual machines in the AZ 1 and the AZ 2. Therefore, some virtual machines in the AZ 1 are in a sub-health state. Stop these virtual machines to restore the service.

In this embodiment of this application, an abnormal logical management unit in the two logical management units may be further determined by using the data packet between the two logical management units that carry the VNF.

Figure 13:
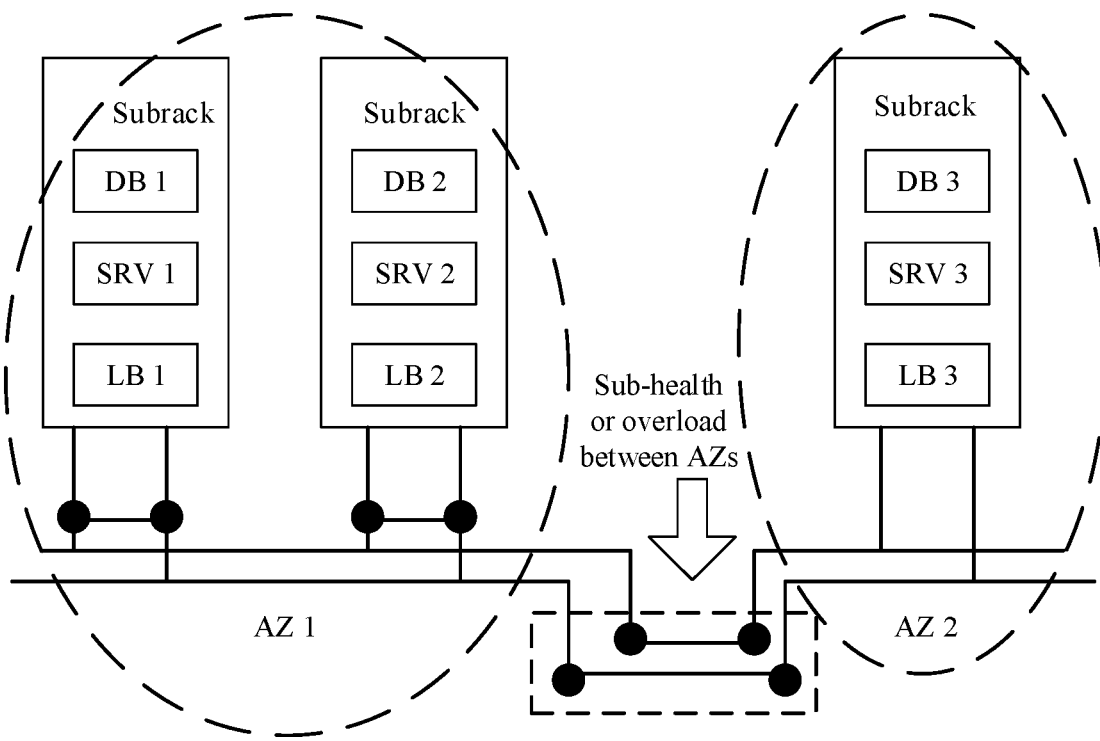
FIG. 13 is a diagram of an example of another path detection method according to an embodiment of this application.

For example, FIG. 13 shows a scenario of an internal communications network fault between the AZs when it is assumed that the management unit is the AZ. Table 3 shows a communication matrix of the AZ 1. Table 4 shows a communication matrix of the AZ 2.

TABLE 3

| | AZ 1 | | | |
|---|---|---|---|---|
| Virtual machine name | Whether packet loss occurs in the AZ 1 | Percentage of virtual machines with the packet loss in the AZ 1 | Whether packet loss occurs in the AZ 2 | Percentage of virtual machines with the packet loss in the AZ 2 |
| Load balancer LB 1 | No | 0 | Yes | 50% |
| Service processing module SRV 1 | No | 0 | Yes | 50% |
| Load balancer LB 2 | No | 0 | Yes | 50% |
| Service processing module SRV 2 | No | 0 | Yes | 50% |

TABLE 4

| | AZ 1 | | | |
|---|---|---|---|---|
| Virtual machine name | Whether packet loss occurs in the AZ 2 | Percentage of virtual machines with the packet loss in the AZ 2 | Whether packet loss occurs in the AZ 1 | Percentage of virtual machines with the packet loss in the AZ 1 |
| Load balancer LB 3 | No | 0 | Yes | 50% |
| Service processing module SRV 3 | No | 0 | Yes | 50% |
| Database DB 3 | No | 0 | Yes | 50% |

Based on the communication matrices shown in Table 3 and Table 4, communication in the AZ 1 is normal, while packet loss occurs between the AZs. It can be inferred that a communications network between the AZs is abnormal. Power off all the virtual machines in the AZ 2 to restore the service.

The foregoing mainly describes, from a perspective of interaction between the network elements, a solution provided in this embodiment of this application. It can be understood that, to implement the foregoing functions, various network elements such as the VNFM or the VNF includes a corresponding hardware structure and/or a software module for performing each function. A person of ordinary skill in the art should easily be aware that, in combination with the examples described in the embodiments disclosed in the present application, algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the VNFM and the VNF may be divided into functional modules based on the foregoing method examples. For example, functional modules may be obtained through division based on corresponding functions, or two or more functions may be integrated into one processing module. The integrated module may be implemented in a form of hardware, or may be implemented in a form of a software functional module. It should be noted that, in this embodiment of this application, module division is an example, and is merely a logical function division. In actual implementation, another division manner may be used.

Figure 14:
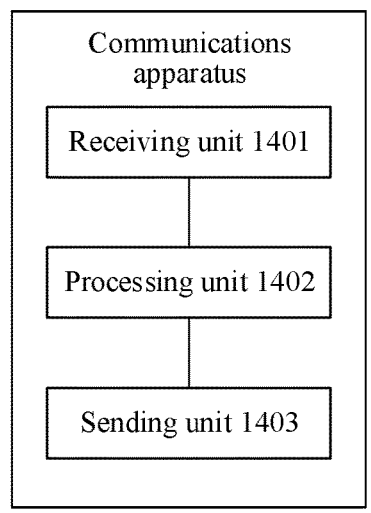
FIG. 14 is a diagram of example composition of a communications apparatus according to an embodiment of this application.

When functional modules are obtained through division based on corresponding functions, FIG. 14 is a diagram of possible example composition of a communications apparatus in the foregoing embodiments. The communications apparatus can perform steps performed by the VNFM or the VNF in any method embodiment in the method embodiments of this application. As shown in FIG. 14, the communications apparatus is a VNFM or a communications apparatus that supports the VNFM to implement the method provided in the embodiments. For example, the communications apparatus may be a chip system, or the communications apparatus is a VNF or a communications apparatus that supports the VNF to implement the method provided in the embodiments. For example, the communications apparatus may be a chip system, and the communications apparatus may include a receiving unit 1401 and a processing unit 1402.

The receiving unit 1401 is configured to support the communications apparatus to perform S301 and S302 in the method shown in FIG. 3, S301, S302, S3044, and S3048 in the method shown in FIG. 6, S301, S302, S3044, S3048, S902, and S904 in the method shown in FIG. 9, and S301, S302, S3044, S3048, and S1004 in the method shown in FIG. 10.

The processing unit 1402 is configured to support the communications apparatus to perform S303 and S304 in the method shown in FIG. 3, S303 in the method shown in FIG. 6, S303 in the method shown in FIG. 9, and S303 in the method shown in FIG. 10.

In this embodiment of this application, as shown in FIG. 14, the communications apparatus may further include a sending unit 1403.

The sending unit 1403 is configured to support the communications apparatus to perform S3041 and S3045 in the method shown in FIG. 6, S3041, S3045, S901, and S903 in the method shown in FIG. 9, and S3041, S3045, and S1001 in the method shown in FIG. 10.

It should be noted that all related content of the steps in the foregoing method embodiments may be cited in function descriptions of corresponding functional modules. Details are not described herein again.

The communications apparatus provided in this embodiment of this application is configured to perform the foregoing methods, and therefore can achieve a same effect as the foregoing methods.

Figure 15:
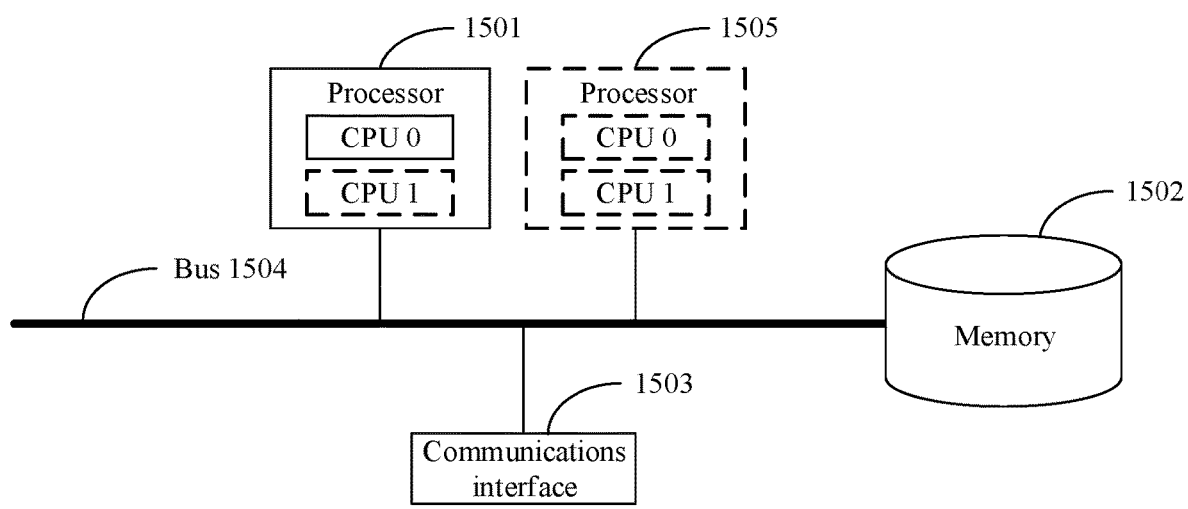
FIG. 15 is a diagram of example composition of a computer according to an embodiment of this application.

FIG. 15 is a diagram of example composition of a computer according to an embodiment of this application. As shown in FIG. 15, the computer may include at least one processor 1501, a memory 1502, a communications interface 1503, and a communications bus 1504.

The following describes components of the computer in detail with reference to FIG. 15.

The processor 1501 is a control center of the computer, and may be a processor or a collective term of a plurality of processing elements. For example, the processor 1501 may be a central processing unit (CPU), or an application specific integrated circuit (ASIC), or may be configured as one or more integrated circuits implementing this embodiment of this application, for example, one or more microprocessors (DSP) or one or more field programmable gate arrays (FPGA).

The processor 1501 may run or execute a software program stored in the memory 1502 and invoke data stored in the memory 1502, to execute various functions of the computer.

In an embodiment, the processor 1501 may include one or more CPUs, for example, a CPU 0 and a CPU 1 shown in FIG. 15.

In an embodiment, the computer may include a plurality of processors, for example, the processor 1501 and a processor 1505 shown in FIG. 15. Each of the processors may be a single-core processor (single-CPU) or may be a multi-core processor (multi-CPU). The processor herein may refer to one or more devices, circuits, and/or processing cores configured to process data (for example, a computer program instruction).

The memory 1502 may be a read-only memory (ROM) or another type of static storage device that can store static information and instructions; or a random access memory (random access memory, RAM) or another type of dynamic storage device that can store information and instructions. The memory 1502 may alternatively be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and that is accessible by a computer, but is not limited thereto. The memory 1502 may exist independently, or may be connected to the processor 1501 by using the bus 1504. The memory 1502 may alternatively be integrated with the processor 1501.

The memory 1502 is configured to store a software program for executing the solution of this application, and the processor 1501 controls execution of the software program.

The communications interface 1503 is configured to communicate with another device or another communications network by using any apparatus such as a transceiver. The communications interface 1503 may include a receiving unit for implementing a receiving function and a sending unit for implementing a sending function.

The communications bus 1504 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 15, but this does not mean that there is only one bus or only one type of bus.

A device structure shown in FIG. 15 does not constitute a limitation on the computer. The computer may include more or fewer components than those shown in the figure, or combine some components, or have different component arrangements.

Figure 16:
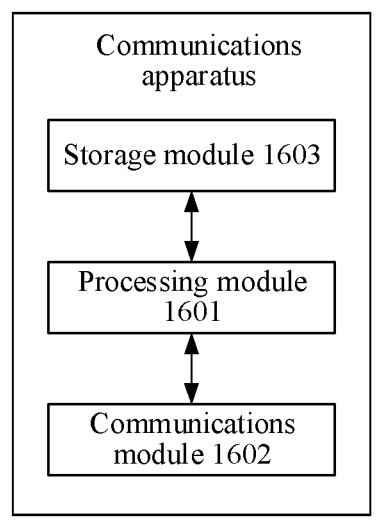
FIG. 16 is a diagram of example composition of another communications apparatus according to an embodiment of this application.

When an integrated unit is used, FIG. 16 is a diagram of another possible example composition of the communications apparatus in the foregoing embodiments. As shown in FIG. 16, the communications apparatus includes a processing module 1601 and a communications module 1602.

The processing module 1601 is configured to control and manage an action of the communications apparatus. For example, the processing module 1601 is configured to support the communications apparatus to perform S303 and S304 in the method shown in FIG. 3, S303 in the method shown in FIG. 6, S303 in the method shown in FIG. 9, S303 in the method shown in FIG. 10, and/or another process used for the technology described in the present application. The communications module 1602 is configured to support the communications apparatus in communicating with another network entity. The communications apparatus may further include a storage module 1603, configured to store program code and data of the communications apparatus.

The processing module 1601 may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module 1602 may be a transceiver, a transceiver circuit, a communications interface, or the like. The storage module 1603 may be a memory.

When the processing module 1601 is the processor, the communications module 1602 is the communications interface, and the storage module 1603 is the memory, the communications apparatus in this embodiment of this application may be the computer shown in FIG. 15.

The foregoing descriptions about implementations allow a person skilled in the art to understand that, for the purpose of convenient and brief description, division of the foregoing functional modules is used as an example for illustration. In actual application, the foregoing functions can be allocated to different functional modules and implemented according to a requirement, that is, an inner structure of the apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed in different places. Some or all of the units may be selected based on actual requirements to achieve the objectives of the solutions of the embodiments. In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit. When the integrated unit is implemented in the form of the software functional unit and sold or used as an independent product, the integrated unit may be stored in a readable storage medium. Based on such understanding, the technical solutions in the embodiments of this application essentially, or the part contributing to the prior art, or all or some of the technical solutions may be implemented in the form of a software product. The software product is stored in a storage medium and includes several instructions to enable a device (which may be a single-chip microcomputer, a chip or the like) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc. The foregoing descriptions are merely implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A virtual network function deployment method, comprising:
    obtaining a virtual network function descriptor (VNFD), wherein the VNFD comprises input parameter information, input adaptation information, and virtual network function (VNF) descriptor information, and wherein the input parameter information comprises N pieces of management unit information and each piece of management unit information is used to describe an attribute of a management unit, and wherein the attribute of the management unit comprises a type and a name of the management unit, and wherein the input adaptation information is used to indicate a mapping relationship between the management unit and a logical management unit, and wherein the VNF descriptor information is used to indicate to deploy a VNF on N logical management units and N is an integer greater than or equal to 2;
    obtaining N management unit identifiers, wherein a capacity of a management unit corresponding to a management unit identifier is the same as a capacity of a fault domain corresponding to the management unit;
    mapping management units corresponding to the N management unit identifiers to the N logical management units based on the input adaptation information; and
    creating the VNF on the N logical management units based on the VNF descriptor information.

2. The virtual network function deployment method according to claim 1, wherein the input parameter information further comprises M pieces of cloud operating system information and storage information, wherein each piece of cloud operating system information is used to describe an attribute of a cloud operating system and the attribute of the cloud operating system comprises a type and a name of the cloud operating system, and wherein the storage information is used to describe a storage attribute and the storage attribute comprises a storage type and a storage name, and wherein the input adaptation information is further used to indicate a mapping relationship between the cloud operating system and the logical management unit and M is an integer greater than or equal to 1.

3. The virtual network function deployment method according to claim 2, wherein after the obtaining N management unit identifiers, the method further comprises:
    obtaining M cloud operating system identifiers, wherein the management units corresponding to the N management unit identifiers belong to M cloud operating systems corresponding to the M cloud operating system identifiers.

4. The virtual network function deployment method according to claim 1, wherein the VNFD further comprises virtual machine deployment information and the virtual machine deployment information is used to indicate a deployment manner of a primary virtual machine, a secondary virtual machine, and a load-sharing virtual machine in the N logical management units.

5. The virtual network function deployment method according to claim 4, wherein the creating the VNF on the N logical management units based on the VNF descriptor information, the method comprising:
    sending a network creation message to a virtualized infrastructure manager (VIM), wherein the network creation message is used to indicate the VIM to allocate a resource required for creating the VNF;
    receiving a network creation confirmation message sent by the VIM;
    sending a virtual machine creation system message to the VIM, wherein the virtual machine creation system message comprises a central processing unit capacity, a memory capacity, and a disk capacity that are required for creating the VNF; and
    receiving a virtual machine creation confirmation system message sent by the VIM.

6. The virtual network function deployment method according to claim 5, wherein after the receiving a virtual machine creation confirmation system message sent by the VIM, the method further comprises:
    sending a correspondence between each of the N logical management units and a virtual machine to the VNF.

7. The virtual network function deployment method according to claim 5, wherein after the receiving a virtual machine creation confirmation system message sent by the VIM, the method further comprises:
    sending a correspondence between each of the N logical management units and a virtual machine to an element management system (EMS).

8. A communications apparatus, comprising:
    a receiver configured to obtain a virtual network function descriptor (VNFD), wherein the VNFD comprises input parameter information, input adaptation information, and virtual network function (VNF) descriptor information, and wherein the input parameter information comprises N pieces of management unit information and each piece of management unit information is used to describe an attribute of the management unit, and wherein the attribute of the management unit comprises a type and a name of the management unit, and wherein the input adaptation information is used to indicate a mapping relationship between the management unit and a logical management unit, and wherein and the VNF descriptor information is used to indicate to deploy a VNF on the N logical management units and N is an integer greater than or equal to 2,
    wherein the receiver is further configured to obtain N management unit identifiers, and wherein a capacity of a management unit corresponding to a management unit identifier is the same as a capacity of a fault domain corresponding to the management unit; and
    a processor configured to map management units corresponding to the N management unit identifiers to the N logical management units based on the input adaptation information,
    wherein the processor is further configured to create the VNF on the N logical management units based on the VNF descriptor information.

9. The communications apparatus according to claim 8, wherein the input parameter information further comprises M pieces of cloud operating system information and storage information, wherein each piece of cloud operating system information is used to describe an attribute of a cloud operating system and the attribute of the cloud operating system comprises a type and a name of the cloud operating system, and wherein the storage information is used to describe a storage attribute, and the storage attribute comprises a storage type and a storage name, and wherein the input adaptation information is further used to indicate a mapping relationship between the cloud operating system and the logical management unit and M is an integer greater than or equal to 1.

10. The communications apparatus according to claim 9, wherein the receiver is further configured to:
obtain M cloud operating system identifiers, wherein the management units corresponding to the N management unit identifiers belong to M cloud operating systems corresponding to the M cloud operating system identifiers.

11. The communications apparatus according to claim 8, wherein the VNFD further comprises virtual machine deployment information and the virtual machine deployment information is used to indicate a deployment manner of a primary virtual machine, a secondary virtual machine, and a load-sharing virtual machine in the N logical management units.

12. The communications apparatus according to claim 11, wherein:
the processor is further configured to send a network creation message to a virtualized infrastructure manager (VIM), wherein the network creation message is used to indicate the VIM to allocate a resource required for creating the VNF,
wherein the receiver is further configured to receive a network creation confirmation message sent by the VIM,
wherein the processor is further configured to send a virtual machine creation system message to the VIM, wherein the virtual machine creation system message comprises a central processor capacity, a memory capacity, and a disk capacity that are required for creating the VNF, and
wherein the receiver is further configured to receive a virtual machine creation confirmation system message sent by the VIM.

13. The communications apparatus according to claim 12, wherein the processor is further configured to:
send a correspondence between each of the N logical management units and a virtual machine to the VNF.

14. The communications apparatus according to claim 12, wherein the processor is further configured to:
send a correspondence between each of the N logical management units and a virtual machine to an element management system (EMS).

15. A communications apparatus, comprising:
a processor configured to detect a first path, wherein the first path is an internal path between two logical management units that carry a virtual network function (VNF),
wherein in response to the first path being faulty, the processor is further configured to detect a second path, wherein the second path is an external path between the two logical management units that carry the VNF,
wherein in response to the second path being normal, the processor is further configured to randomly select, from the two logical management units that carry the VNF, one logical management unit to provide a service to the outside; or
wherein in response to the second path being faulty, the processor is further configured to detect, by using a third-party network element, a path of a first logical management unit of the two logical management units that carry the VNF, and detect, by using the third-party network element, a path of a second logical management unit that carries the VNF, and
wherein the processor is further configured to determine that a logical unit whose path to the third party network element is normal provides the service to the outside.

* * * * *